(12) United States Patent
Togawa

(10) Patent No.: US 11,983,930 B2
(45) Date of Patent: May 14, 2024

(54) PERSON FLOW PREDICTION SYSTEM, PERSON FLOW PREDICTION METHOD, AND PROGRAMRECORDING MEDIUM

(71) Applicant: NEC Corporation, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 87 days.

(21) Appl. No.: 17/907,762

(22) PCT Filed: Mar. 27, 2020

(86) PCT No.: PCT/JP2020/013887
§ 371 (c)(1),
(2) Date: Aug. 29, 2022

(87) PCT Pub. No.: WO2021/192190
PCT Pub. Date: Sep. 30, 2021

(65) Prior Publication Data
US 2023/0112675 A1 Apr. 13, 2023

(51) Int. Cl.
*G06F 17/18* (2006.01)
*G06Q 30/0202* (2023.01)
(Continued)

(52) U.S. Cl.
CPC ......... *G06V 20/53* (2022.01); *G06Q 30/0202* (2013.01); *G06T 11/206* (2013.01);
(Continued)

(58) Field of Classification Search
None
See application file for complete search history.

(56) References Cited

U.S. PATENT DOCUMENTS

2012/0020518 A1* 1/2012 Taguchi .................. G06T 7/292
382/103
2016/0292197 A1* 10/2016 Morimoto ......... G06F 16/24578
(Continued)

FOREIGN PATENT DOCUMENTS

JP 2020-009124 A 1/2020
WO 2018/008203 A1 1/2018

OTHER PUBLICATIONS

International Search Report for PCT Application No. PCT/JP2020/013887, dated Aug. 4, 2020.
(Continued)

*Primary Examiner* — Martin Mushambo
(74) *Attorney, Agent, or Firm* — Sughrue Mion, PLLC

(57) ABSTRACT

A prediction device f includes an acquisition unit and a prediction unit. The acquisition unit is configured to acquire attribute data pertaining to the plurality of exhibits and the number of visitors to each of the plurality of exhibits during a first period in the display area in which the plurality of exhibition articles are exhibited. The prediction unit is configured to predict a future flow of persons to the plurality of exhibits by a prediction model. The prediction model is generated using attribute data for a second period that is a period previous to the first period, graph time-series data pertaining to a change over time in a movement pattern for each of the plurality of visitors to the plurality of exhibits during the second period, the number of visitors to the exhibits, and the number of visitors to each of the plurality of exhibits.

20 Claims, 25 Drawing Sheets

(51) Int. Cl.
*G06T 11/20* (2006.01)
*G06V 10/70* (2022.01)
*G06V 20/40* (2022.01)
*G06V 20/52* (2022.01)
*G06V 40/20* (2022.01)

(52) U.S. Cl.
CPC .............. *G06V 10/70* (2022.01); *G06V 20/40* (2022.01); *G06V 40/20* (2022.01)

(56) References Cited

U.S. PATENT DOCUMENTS

| | | | | |
|---|---|---|---|---|
| 2016/0335511 | A1* | 11/2016 | Macdonald | G06V 40/18 |
| 2018/0005046 | A1* | 1/2018 | Miyano | G06T 7/246 |
| 2018/0101970 | A1* | 4/2018 | Waniguchi | G06Q 50/26 |
| 2018/0211096 | A1* | 7/2018 | Cao | G06V 40/171 |
| 2019/0122233 | A1 | 4/2019 | Itoh et al. | |
| 2020/0160715 | A1* | 5/2020 | Kusama | G06V 40/103 |
| 2021/0081716 | A1* | 3/2021 | Namioka | G06V 40/10 |
| 2021/0272453 | A1 | 9/2021 | To et al. | |

OTHER PUBLICATIONS

English translation of Written opinion for PCT Application No. PCT/JP2020/013887, dated Aug. 4, 2020.
Qi Song, et al., "TGNet: Learning to Rank Nodes in Temporal Graphs", Proceedings of the 27th ACM International Conference on Information and Knowledge Management, p. 97-106.
Dongkuan Xu et al., "Spatio-Temporal Attentive RNN for Node Classification in Temporal Attributed Graphs", Proceedings of the Twenty-Eighth International Joint Conference on Artificial Intelligence (IJCAI-19), <URL: https://www.ijcai.org/Proceedings/2019/0548.pdf>, pp. 3947-3953.
Wenchao Yu, et al., "NetWalk: A Flexible Deep Embedding Approach for Anomaly Detection in Dynamic Networks", KDD 2018, p. 2672-2681.
Zeyu Li, et al., "Interpretable Click-Through Rate Prediction through Hierarchical Attention", WSDM 2020: The Thirteenth ACM International Conference on Web Search and Data Mining, pp. 313-321.
Imai, Takeaki, "Method for Estimating Parameter of Person Flow Simulation", The 9th Forum on Data Engineering and Information Management, Mar. 6, 2017, pp. 1-7.

* cited by examiner

Fig. 9

| BOOTH | EXHIBITION FORM | CLASSIFICATION |
|---|---|---|
| 1 | EXHIBITION OF SAMPLE | IT |
| 2 | PAMPHLET | ADVERTISEMENT |
| 3 | DEMONSTRATION | ADVERTISEMENT |
| 4 | POSTER | ADVERTISEMENT |
| 5 | POSTER | IT |
| 6 | POSTER | COMMON |
| 7 | DEMONSTRATION | IT |
| 8 | PAMPHLET | IT |

Fig. 10

| TIME ZONE | 10:00 | 11:00 | 12:00 | ... |
|---|---|---|---|---|
| 1 | 100 PERSONS/HOUR | 80 PERSONS/HOUR | 110 PERSONS/HOUR | ... |
| 2 | 30 PERSONS/HOUR | ... | ... | |
| 3 | ... | | | |
| 4 | | | | |
| 5 | | | | |
| 6 | | | | |
| 7 | | | | |
| 8 | | | | |
| CONTENT OF SEMINAR | IT | ADVERTISEMENT | IT | ... |

Fig. 11

| VISITOR ID | VISIT BOOTH NUMBER/VISIT TIME | | | | | | | | | | | | |
|---|---|---|---|---|---|---|---|---|---|---|---|---|---|
| 1 | 2 | 10:55 | 3 | 11:27 | 7 | 11:44 | | | | | | | |
| 2 | 2 | 11:01 | 6 | 11:20 | 4 | 11:45 | 5 | 12:05 | 7 | 12:46 | | | |
| 3 | 2 | 11:25 | 5 | 11:50 | 6 | 12:15 | 4 | 12:47 | 7 | 13:03 | | | |
| 4 | 3 | 11:30 | 5 | 11:55 | 6 | 12:13 | 7 | 12:45 | | | | | |
| 5 | 5 | 11:31 | 1 | 11:42 | 8 | 12:03 | | | | | | | |
| ... | | | | | | | | | | | | | |

Fig. 18

| PRODUCT SHELF | CLASSIFICATION OF PRODUCT |
|---|---|
| 1 | FOOD |
| 2 | DAILY NECESSARIES |
| 3 | BREAD AND NOODLES |
| 4 | BEVERAGE |
| 5 | LUNCH BOX |
| 6 | SPECIAL |

Fig. 19

| | PERIOD | SPECIAL CORNER |
|---|---|---|
| A | JANUARY | DAILY DISH |
| B | FEBRUARY | DESSERT |
| C | MARCH | SNACKS |
| ... | ... | ... |
| | | |
| | | |

Fig. 20

| STORE VISITOR IDENTIFICATION INFORMATION | PURCHASE AMOUNT |
|---|---|
| A1 | 670 YEN |
| A2 | 1100 YEN |
| ... | |
| B1 | 400 YEN |
| B2 | 300 YEN |
| ... | |

Fig. 21

| STORE VISITOR IDENTIFICATION INFORMATION | STORE VISIT DATE | PRODUCT SHELF THAT VISITOR STOPPED BY | | | | |
|---|---|---|---|---|---|---|
| A1 | JANUARY 5TH | 1 | 3 | 6 | | |
| A2 | JANUARY 5TH | 2 | 4 | 6 | 5 | |
| ⋮ | | | | | | |
| B1 | FEBRUARY 6TH | 2 | 5 | 6 | 4 | |
| B2 | FEBRUARY 6TH | 3 | 5 | | | |
| ⋮ | | | | | | |

PERSON FLOW PREDICTION SYSTEM, PERSON FLOW PREDICTION METHOD, AND PROGRAMRECORDING MEDIUM

This application is a National Stage Entry of PCT/JP2020/013887 filed on Mar. 27, 2020, the contents of all of which are incorporated herein by reference, in their entirety.

TECHNICAL FIELD

The present invention relates to a technique for predicting a flow of a person, and particularly to, a technique for visualizing a prediction result.

BACKGROUND ART

How exhibition products are arranged in an exhibition hall, a store, or the like may greatly affect whether to have a business discussion, whether to purchase a product, or the like. Therefore, it is preferable to be able to predict a best way to arrange exhibition products at the time of determining the layout of the exhibition hall or the like. As a technique for predicting a best way to arrange exhibition products, for example, a technique for predicting a purchase tendency based on a flow of a person in an exhibition hall or the like is used. The technique for predicting a purchase tendency based on a flow of a person is disclosed in, for example, PTL 1.

Based on the fact that sales in a store or the like are based on movements of people between points, a simulation device according to PTL 1 generates a purchase model using information on a flow of a person and information on an amount of a product or a service purchased by the person to predict an amount of a product or a service purchased by a person moving in the facility.

CITATION LIST

Patent Literature

[PTL 1]: WO 2018/008203 A

SUMMARY OF INVENTION

Technical Problem

However, the technique of PTL 1 is not sufficient for the following reason. In the simulation device according to PTL 1, since the prediction is based on a flow of a person and a purchase amount between two points, it is not possible to perform prediction in consideration of a change in the flow of the person in a case where routes between a plurality of points change according to a change in product or service to be sold for each period or the like. For this reason, in the technique of PTL 1, there is a possibility that accuracy of prediction is not improved in a case where a product or a flow of a person changes with time.

An object of the present invention is to provide a person flow prediction system, a person flow prediction method, and a program recording medium capable of improving accuracy of prediction even when circumstances change with time.

Solution to Problem

The person flow prediction system according to the present invention is a person flow prediction system for predicting a person flow in an exhibition hall where a plurality of exhibition articles are exhibited, and includes an acquisition unit and a prediction unit. The acquisition unit acquires attribute data regarding a plurality of exhibits and the number of visitors to each of the plurality of exhibits in a first period. The prediction unit predicts a future person flow of a visitor to the plurality of exhibits by inputting the attribute data and the number of visitors to each of the plurality of exhibits acquired by the acquisition unit to a prediction model generated using attribute data for a second period that is a period previous to the first period, graph time-series data regarding a time-series change in movement pattern for each of a plurality of visitors to the plurality of exhibits during the second period, and the number of visitors to each of the plurality of exhibits.

The person flow prediction method according to the present invention is a person flow prediction method for predicting a person flow in an exhibition hall where a plurality of exhibition articles are exhibited. The person flow prediction method according to the present invention includes acquiring attribute data about a plurality of exhibits and the number of visitors to each of the plurality of exhibits in a first period. The person flow prediction method according to the present invention also includes predicting a future person flow of a visitor to the plurality of exhibits by inputting the attribute data and the number of visitors to each of the plurality of exhibits in the first period to a prediction model generated using attribute data for a second period that is a period previous to the first period, graph time-series data regarding a time-series change in movement pattern for each of a plurality of visitors to the plurality of exhibits during the second period, and the number of visitors to each of the plurality of exhibits.

The program recording medium according to the present invention records a person flow prediction program for predicting a person flow in an exhibition hall where a plurality of exhibition articles are exhibited. The person flow prediction program causes a computer to execute processing of acquiring attribute data about a plurality of exhibits and the number of visitors to each of the plurality of exhibits in a first period. The person flow prediction program also causes the computer to execute processing of predicting a future person flow of a visitor to the plurality of exhibits by inputting the attribute data and the number of visitors to each of the plurality of exhibits in the first period to a prediction model generated using attribute data for a second period that is a period previous to the first period, graph time-series data regarding a time-series change in movement pattern for each of a plurality of visitors to the plurality of exhibits during the second period, and the number of visitors to each of the plurality of exhibits.

Advantageous Effects of Invention

According to the present invention, it is possible to improve accuracy in predicting a person flow in a case where circumstances change with time, and improve cost effectiveness in exhibiting exhibition articles or the like and optimize the person flow according to a result of predicting the person flow.

BRIEF DESCRIPTION OF DRAWINGS

FIG. 9 is a diagram illustrating an example of input data according to the first example embodiment of the present invention.

FIG. 10 is a diagram illustrating an example of input data according to the first example embodiment of the present invention.

FIG. 11 is a diagram illustrating an example of time-series movement data according to the first example embodiment of the present invention.

FIG. 18 is a diagram illustrating an example of input data according to the second example embodiment of the present invention.

FIG. 19 is a diagram illustrating an example of input data according to the second example embodiment of the present invention.

FIG. 20 is a diagram illustrating an example of input data according to the second example embodiment of the present invention.

FIG. 21 is a diagram illustrating an example of time-series movement data according to the second example embodiment of the present invention.

EXAMPLE EMBODIMENTS

First Example Embodiment

Figure 1:
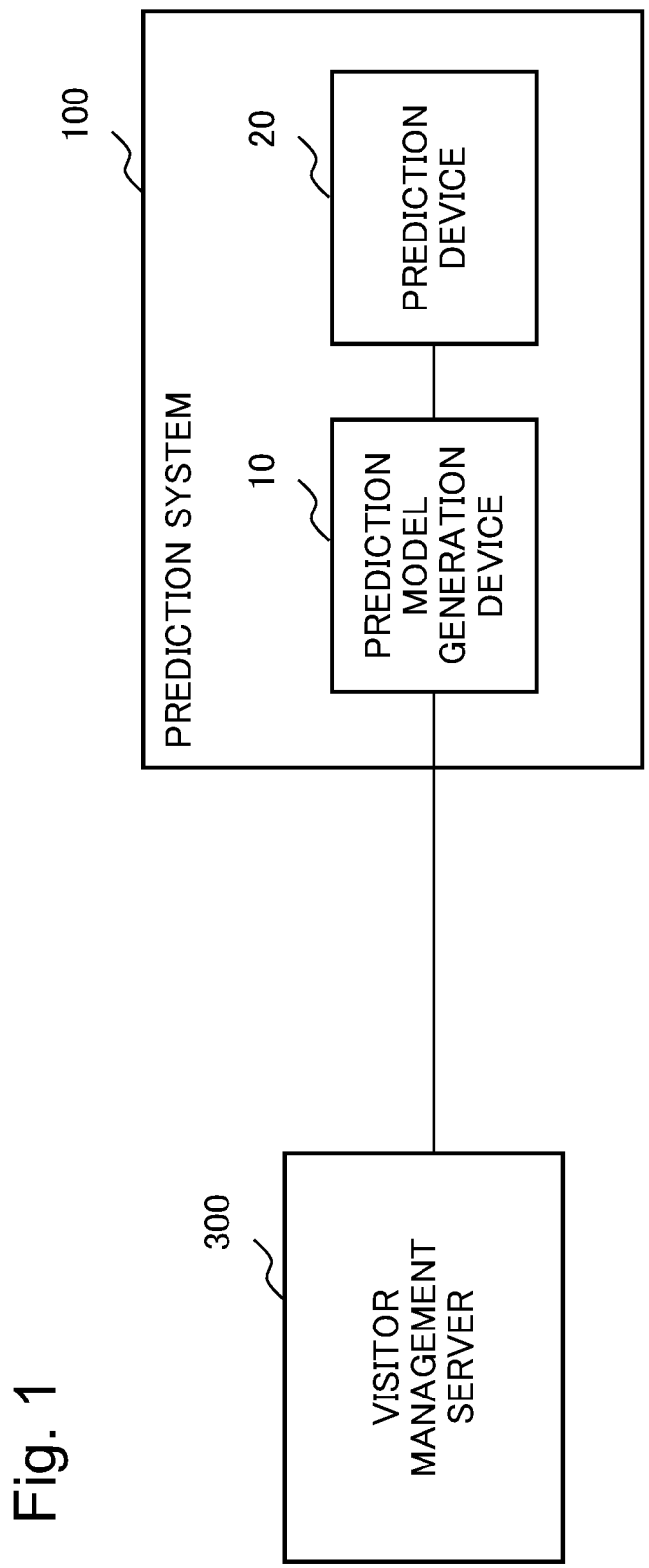
FIG. 1 is a diagram illustrating a configuration of a person flow prediction system according to a first example embodiment of the present invention.

A first example embodiment of the present invention will be described in detail with reference to the drawings. FIG. 1 is a diagram illustrating an outline of a configuration of a person flow prediction system according to the present example embodiment. The person flow prediction system according to the present example embodiment includes a prediction system 100 and a visitor management server 300. The prediction system 100 and the visitor management server 300 are connected to each other via a network.

The person flow prediction system according to the present example embodiment is a system that predicts a flow of a person (a person flow) in an area where a route along which the person is to move is not fixed, such as an exhibition or a store. The person flow refers to a flow of a person in an area where a route along which the person is to move is not fixed, such as an exhibition or a store. The person flow may include information indicating a movement tendency of a plurality of persons. In the following description, a system for predicting a flow of a person in an exhibition will be described as an example.

Figure 2:
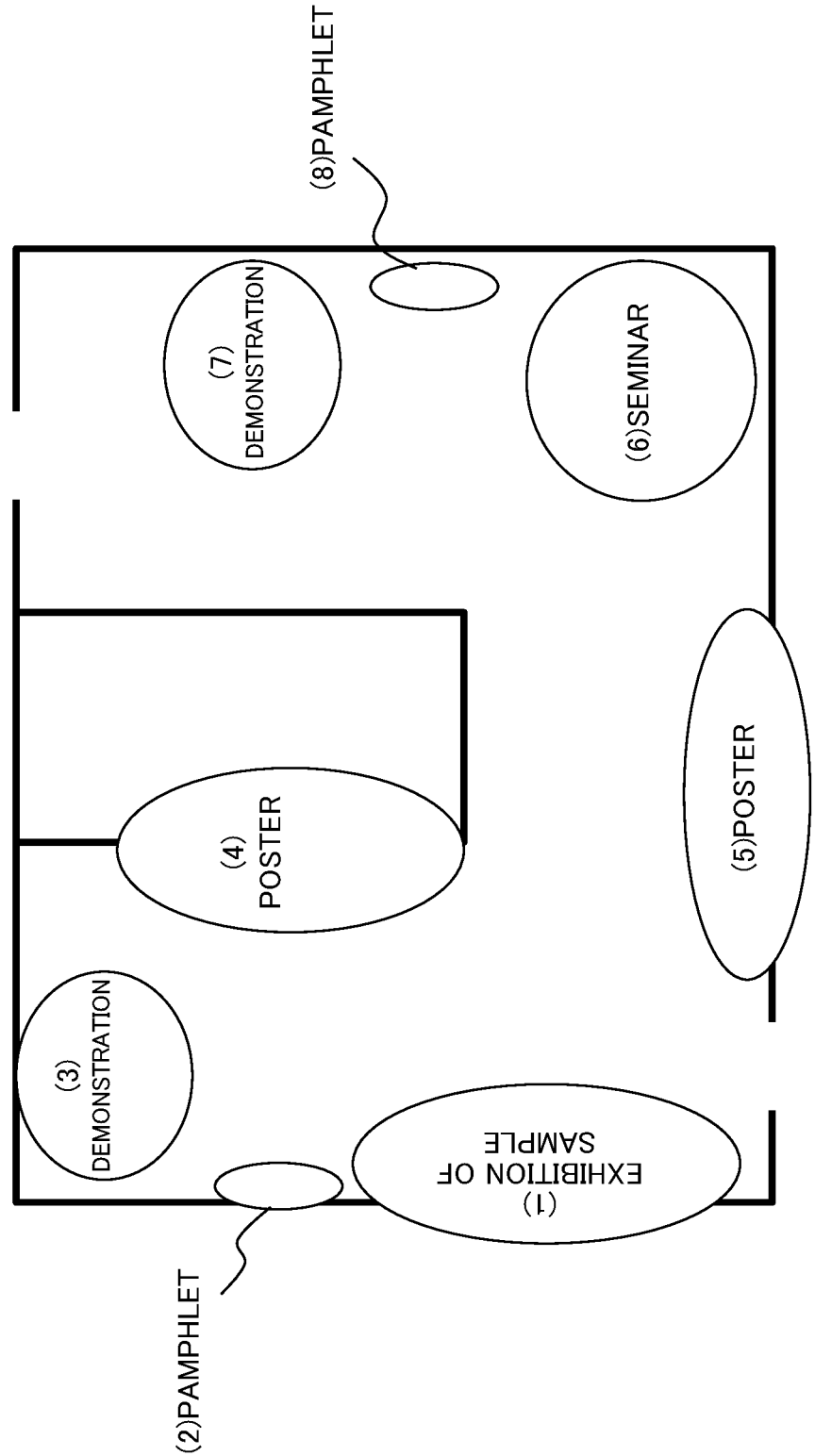
FIG. 2 is a diagram illustrating an example of a layout of an exhibition hall for which a person flow is to be predicted according to the first example embodiment of the present invention.

FIG. 2 is a diagram schematically illustrating an example of a layout of an exhibition hall. FIG. 2 illustrates an example in which sample products are exhibited, pamphlets for distribution are provided, demonstrations are performed, posters are exhibited, and seminars are held in eight booths installed at respective positions in the exhibition hall. In FIG. 2, each visitor to the exhibition is free to move between the eight booths. A number in brackets in FIG. 2 indicates a number for identifying each booth. The number of booths in the exhibition hall may be other than eight.

A configuration of the prediction system 100 will be described. The prediction system 100 includes a prediction model generation device 10 and a prediction device 20. The prediction model generation device 10 and the prediction device 20 are connected to each other via a network. The prediction model generation device 10 and the prediction device 20 may be formed as an integrated device.

Figure 3:
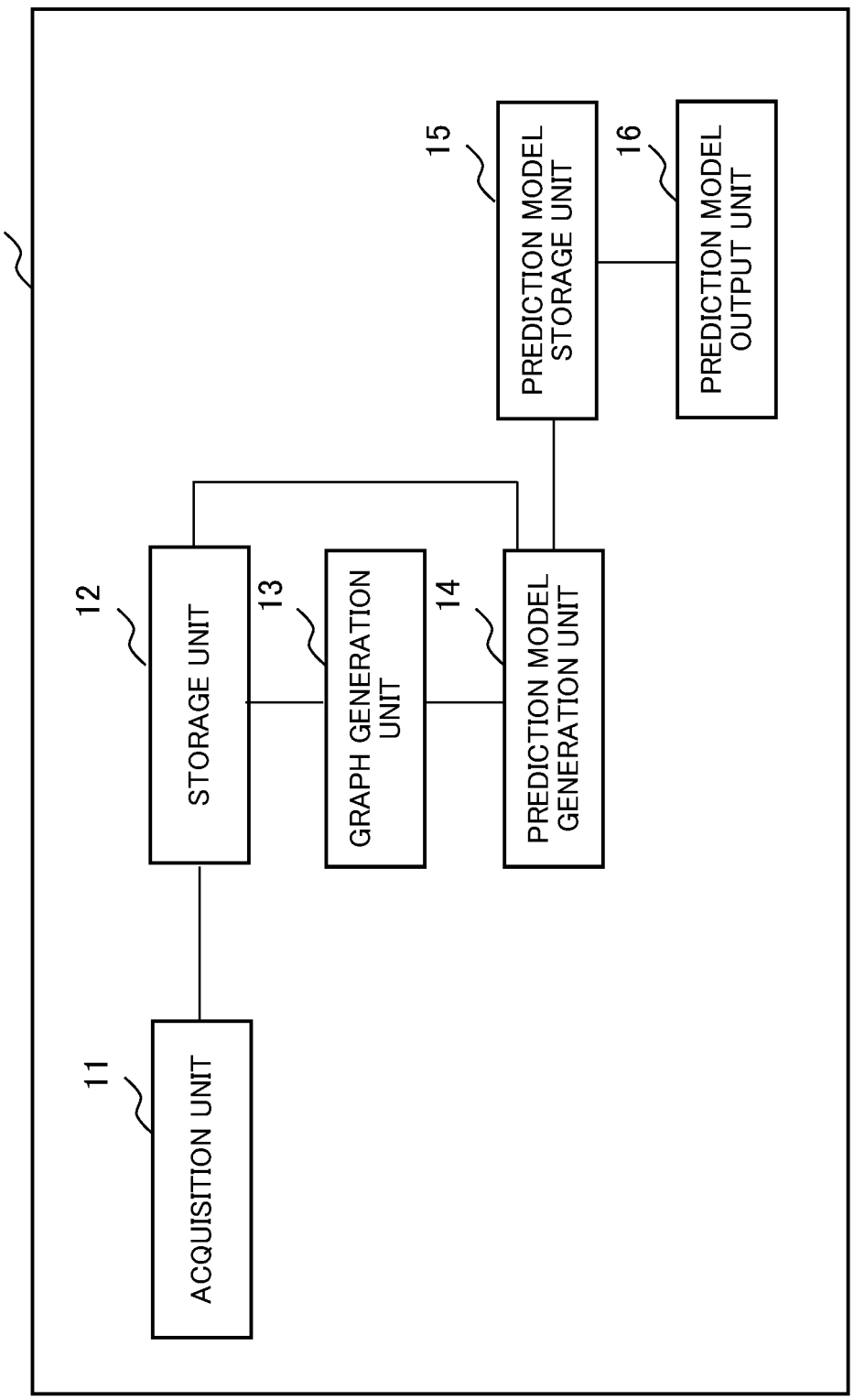
FIG. 3 is a diagram illustrating a configuration of a prediction model generation device according to the first example embodiment of the present invention.

A configuration of the prediction model generation device 10 will be described. FIG. 3 is a diagram illustrating a configuration of the prediction model generation device 10. The prediction model generation device 10 includes an acquisition unit 11, a storage unit 12, a graph generation unit 13, a prediction model generation unit 14, a prediction model storage unit 15, and a prediction model output unit 16.

The prediction model generation device 10 is a device that generates a prediction model used at the time of predicting a person flow from data on contents of exhibition articles has or the like.

The acquisition unit 11 acquires attribute data used for generating the prediction model. The acquisition unit 11 receives an input of attribute data for each booth in the exhibition used for generating the prediction model. The data on the exhibition contents for each booth may be input by an operator, or may be acquired from another server or the like via a network. The attribute data about each booth in the exhibition refers to data indicating an exhibition content or state in each booth. Examples of the attribute data about the booth includes one or more items of information about an exhibitor or an exhibition article such as an exhibition form, a field of an exhibition article, a content of a seminar for each time, an identifier of an exhibit, an exhibition position, an exhibition participation form, an exhibition participant for each booth, a business type that an exhibition participant is in, a business scale of an exhibition participant, the number of visitors that an exhibition participant attracted in the past, a product associated with an exhibition participation article, and a sales record of an exhibition participation article, but the attribute data about the booth is not limited thereto, and any data relating to the attribute of the exhibition may be used.

In addition, the acquisition unit 11 acquires data on the number of visitors to each booth. For example, the acquisition unit 11 acquires data on the number of visitors for each time zone from the visitor management server 300. The number of visits for each time zone refers to the number of persons who visit each booth per unit time. The data on the number of visiting persons for each time zone may be data on the number of staying persons for each time zone. The number of visits for each time zone refers to an average value of the numbers of persons staying in each booth for each time zone.

The acquisition unit 11 acquires time-series movement data related to a time-series change in movement of a person in an area. The acquisition unit 11 acquires, from the visitor management server 300, information on history regarding booths that a visitor to the exhibition has visited as data on history of time-series movement. The information on history regarding booths that the visitor has visited is information in which visitor identification information, visited booth identification information, and visit time information are associated with each other. The history regarding booths that the visitor has visited is also referred to as movement history.

In addition, the acquisition unit 11 can acquire the time-series movement data using a sensor installed in an area to communicate with a terminal device carried or worn by a person in the area according to a wireless communication standard such as WiFi (registered trademark) or Bluetooth (registered trademark). Here, the terminal device carried or worn by the person in the area is, for example, a smartphone, a mobile phone, a tablet terminal, a personal computer (PC), or a wearable device (e.g., a wristwatch-type device, a ring-type device, a glasses-type device, a contact lens-type device, a cloth-type device, or a hearable device). Furthermore, the acquisition unit 11 can acquire the time-series movement data about the person in the area through an imaging device capable of imaging a predetermined region in the area.

The storage unit 12 stores each piece of the data input from the acquisition unit 11.

Figure 4:
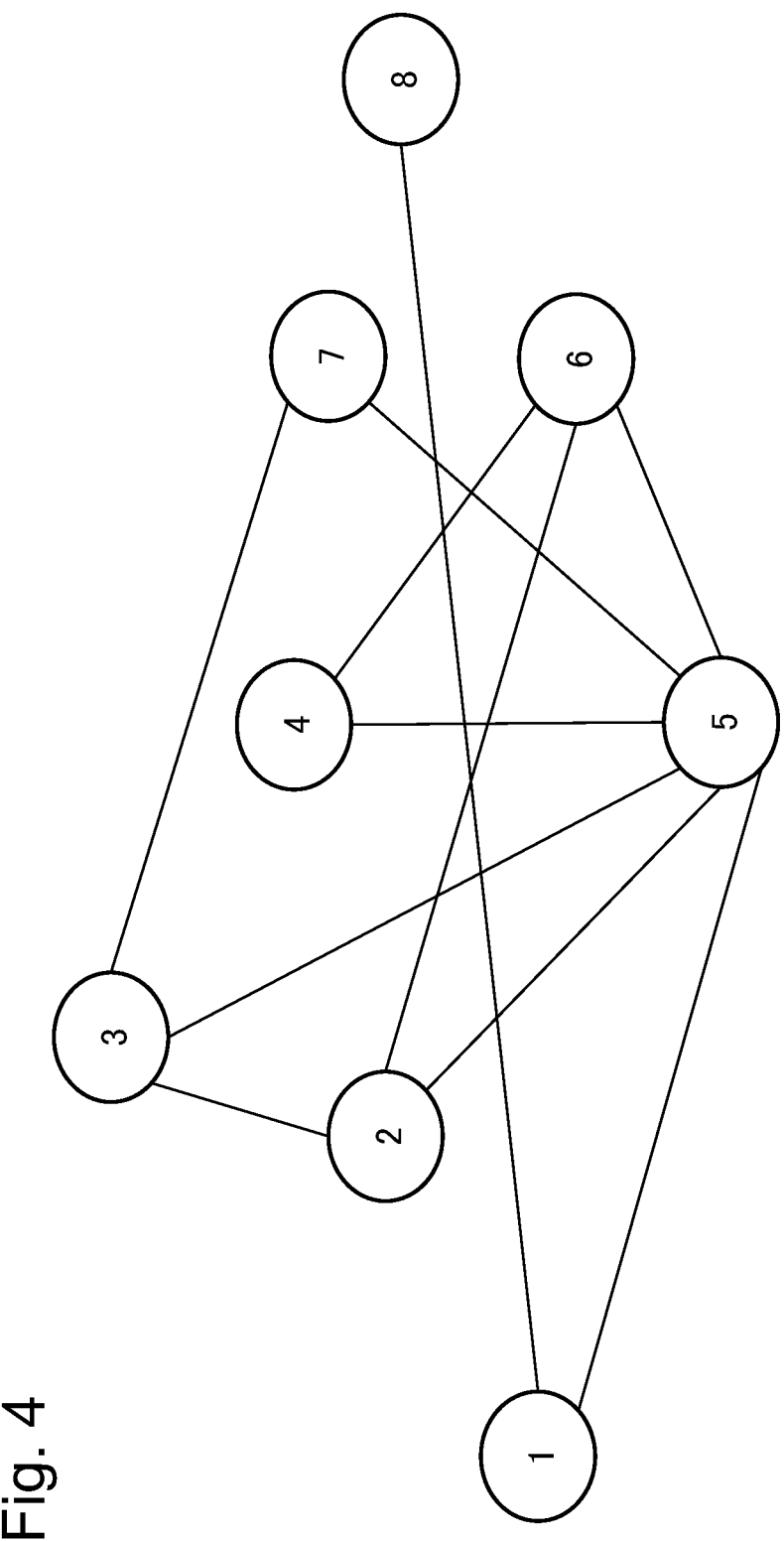
FIG. 4 is a diagram schematically illustrating an example of a graph according to the first example embodiment of the present invention.

The graph generation unit 13 generates graph data as graph time-series data based on the time-series movement data for each person. The graph time-series data refers to graph structure data in which an exhibition in an area is indicated by a node and a movement of a person between nodes is indicated by an edge. The graph time-series data is data indicating movement patterns of a plurality of persons whose movement histories have been acquired, that is, time-series movement trajectories. The graph time-series data is data including a time-series change in movement pattern. The time-series change in movement pattern means that the movement pattern changes in time series, for example, according to a change in state such as a change in exhibition content. Based on the information on history regarding booths that the visitor has visited, the graph generation unit 13 generates a graph in which the booths that the visitor has visited are indicated by nodes and a movement route of the visitor between the booths is indicated by an edge. FIG. 4 schematically illustrates an example of a graph generated by the graph generation unit 13. In FIG. 4, movement histories of a plurality of visitors are collectively shown as one graph. In FIG. 4, a circle indicates each booth set as a node. A number in the circle indicates a number for identifying the booth. In addition, in FIG. 4, a straight line connecting booths, which are indicated by nodes, to each other, indicates an edge showing that the visitor has moved between the booths. Note that the graph generated by the graph generation unit 13 is not limited to what is obtained by collecting time-series movement data about a plurality of visitors as illustrated in FIG. 4, and may be a graph for each person in the area.

The prediction model generation unit 14 generates a prediction model that predicts a person flow from attribute data about each node based on the graph time-series data and the attribute data about each node of the graph. The prediction model generation unit 14 generates a prediction model by calculating a feature amount of a graph by machine learning using a neural network (NN) or deep learning, using graph time-series data in which each booth is indicated by a node and a movement of a visitor between nodes is indicated by an edge, attribute data about each node, and the number of visitors to the booth as inputs. The prediction model may be generated using any machine learning method such as supervised learning, unsupervised learning, semi-supervised learning, or reinforcement learning. As the attribute data about each booth, data indicating an exhibition form of each booth, a field of a product or a service to be exhibited, and other characteristics of each booth is used. In addition, as label data at the time of performing supervised learning, at least one of, for example, whether a business discussion has been conducted, a stay time in the exhibition hall, the number of visited booths, a satisfaction level in a questionnaire, whether a specific exhibition has been visited, whether an exhibition has been visited again, whether a product has been purchased, and whether a sample product has been received, for each visitor to an exhibition, can be used.

For example, assuming that a period during which an exhibition that is a person flow prediction target is held is defined as a first period and a period during which a previous exhibition was held is defined as a second period, the prediction model generation unit 14 generates a prediction model based on graph time-series data or the like in the second period. The prediction model generated based on the graph time-series data in the second period or the like is used for predicting a person flow in the exhibition during the first period.

The prediction model generation unit 14 may update the prediction model by re-learning the generated prediction model. The prediction model generation unit 14 re-learns the prediction model based on a result of carrying out an exhibition for which the attribute of each booth is set based on a result of predicting a person flow for the first period using the prediction model. The prediction model generation unit 14 performs re-learning based on the attribute data about each booth in the exhibition using the result of predicting a person flow, graph time-series data based on movement histories of visitors, and the number of visitors to each booth. The re-learning makes it possible to further improve accuracy of prediction. In addition, the prediction model generation unit 14 may newly generate a prediction model based on a result of carrying out an exhibition for which the attribute of each booth is set based on the measurement result.

The prediction model generation unit 14 generates a prediction model by calculating a feature amount of a graph, for example, using a TGNet method. In the TGNet method, machine learning is performed using dynamic data, static data, and label data as inputs, and a learned model is generated. Details of the TGNet method are described in Qi Song, et al., "TGNet: Learning to Rank Nodes in Temporal Graphs", Proceedings of the 27th ACM International Conference on Information and Knowledge Management, p. 97-106.

The prediction model generation unit 14 may generate a prediction model using a STAR method. In the STAR method, the prediction model is generated by calculating a feature amount of a graph using data on the graph at a plurality of times as input. Details of the STAR method are described in Dongkuan Xu et al., "Spatio-Temporal Attentive RNN for Node Classification in Temporal Attributed Graphs", Proceedings of the Twenty-Eighth International Joint Conference on Artificial Intelligence (IJCAI-19), [retrieved on Feb. 27, 2020] Internet <URL: https://www.ijcai.org/Proceedings/2019/0548.pdf>.

Alternatively, the prediction model generation unit 14 may extract a feature amount, for example, using a method for extracting a feature amount such as a Netwalk method, and generate a prediction model using a prediction algorithm such as Gradient Boosting. Details of the Netwalk method are described in Wenchao Yu, et al., "NetWalk: A Flexible Deep Embedding Approach for Anomaly Detection in Dynamic Networks", KDD 2018, p. 2672-2681. Instead of Gradient Boosting, an InerHAT method may be used. Details of the InerHAT method are described in Zeyu Li, et al., "Interpretable Click-Through Rate Prediction through Hierarchical Attention", WSDM 2020: The Thirteenth ACM International Conference on Web Search and Data Mining.

The prediction model storage unit 15 stores the prediction model generated by the prediction model generation unit 14.

The prediction model output unit 16 outputs the prediction model stored in the prediction model storage unit 15 to the prediction device 20.

Processing by each of the acquisition unit 11, the graph generation unit 13, the prediction model generation unit 14, and the prediction model output unit 16 is performed by executing a computer program on a central processing unit (CPU). In addition, a graphics processing unit (GPU) may be combined with the CPU.

Each of the storage unit 12 and the prediction model storage unit 15 are constituted, for example, using a hard disk drive. Each of the storage unit 12 and the prediction model storage unit 15 may be constituted by a nonvolatile semiconductor storage device or a combination of a plurality of types of storage devices.

Figure 5:
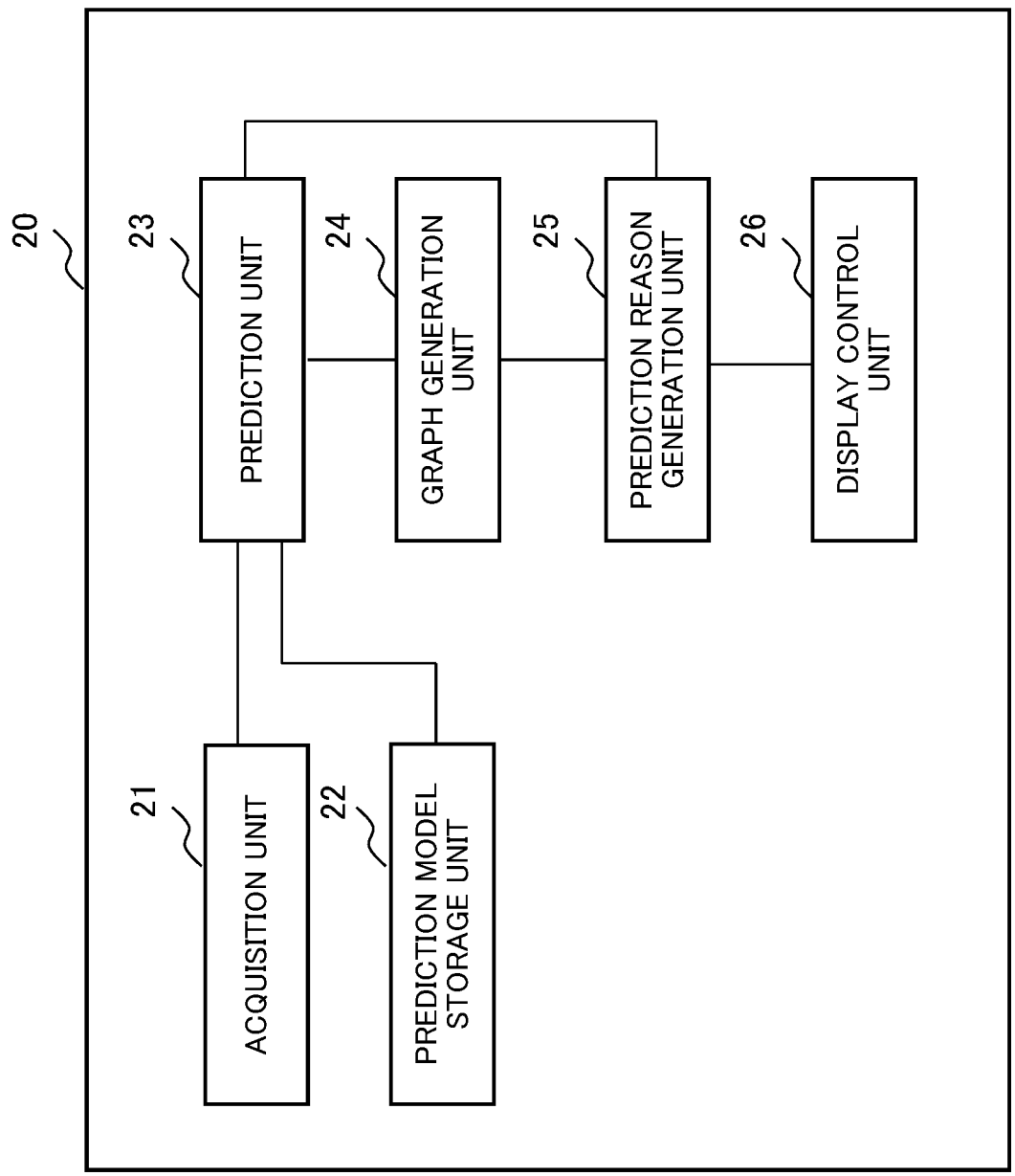
FIG. 5 is a diagram illustrating a configuration of a prediction device according to the first example embodiment of the present invention.

A configuration of the prediction device 20 will be described. FIG. 5 is a diagram illustrating a configuration of the prediction device 20. The prediction device 20 includes an acquisition unit 21, a prediction model storage unit 22, a prediction unit 23, a graph generation unit 24, a prediction reason generation unit 25, and a display control unit 26.

The acquisition unit 21 acquires data used for predicting a person flow using a prediction model. As the data used for predicting a person flow using the prediction model, data on exhibition content for each booth in the exhibition is input to the acquisition unit 21.

The prediction model storage unit 22 stores the prediction model generated by the prediction model generation device 10.

The prediction unit 23 predicts a person flow from the input data based on the prediction model stored in the prediction model storage unit 22. The prediction unit 23 predicts a person flow in the exhibition using the prediction model, based on the input data on exhibition content for each booth in the exhibition.

The graph generation unit 24 generates, as graph time-series data, a graph including nodes each indicating an exhibition that a visitor has visited and edges each indicating a visit order. In the graph generated by the graph generation unit 24, the edge may be expressed as an arrow to indicate a direction in which a person in an area moves, or a thickness of the edge may be changed depending on whether the number of moving persons are large or small. In addition, in the graph generated by the graph generation unit 24, the size of the node may be changed depending on the number of visitors.

The prediction reason generation unit 25 generates a reason for the prediction made by the prediction unit 23.

The display control unit 26 controls a display unit (not illustrated) included in the prediction device 20 or a display device provided outside the prediction device 20 to display a prediction result to which the reason for the prediction is added. In addition, the display control unit 26 may control the display on the display device by transmitting a prediction result to which the reason for the prediction is added to a terminal of a user who uses the prediction result, but the method of controlling the display is not limited thereto. Therefore, according to the present invention, since the reason for the prediction is presented in addition to the prediction of the person flow, it is possible to more suitably support the operation of the exhibition or the like.

Note that the display control unit 26 may control the display device to display only the prediction result on the display device. By only displaying the prediction result, it is possible to present the reason for the prediction in addition to the prediction of the person flow, making it possible to suitably support the operation of the exhibition or the like.

Processing by each of the acquisition unit 21, the prediction unit 23, the graph generation unit 24, the prediction reason generation unit 25, and the display control unit 26 is performed by executing a computer program on the CPU.

The prediction model storage unit 22 is constituted, for example, using a hard disk drive. The prediction model storage unit 22 may be constituted by a nonvolatile semiconductor storage device or a combination of a plurality of types of storage devices.

In FIG. 1, the visitor management server 300 collects time-series movement data about a visitor in an area of the exhibition hall. The visitor management server 300 acquires information on booths that the visitor has visited from, for example, a visitor identification information reading device provided at a reception of each booth. The visitor management server 300 holds, as visit history data, visitor identification information, visited booth identification information, and visit date and time information in association with each other. The visitor management server 300 transmits the time-series movement data to the prediction model generation device 10.

Figure 6:
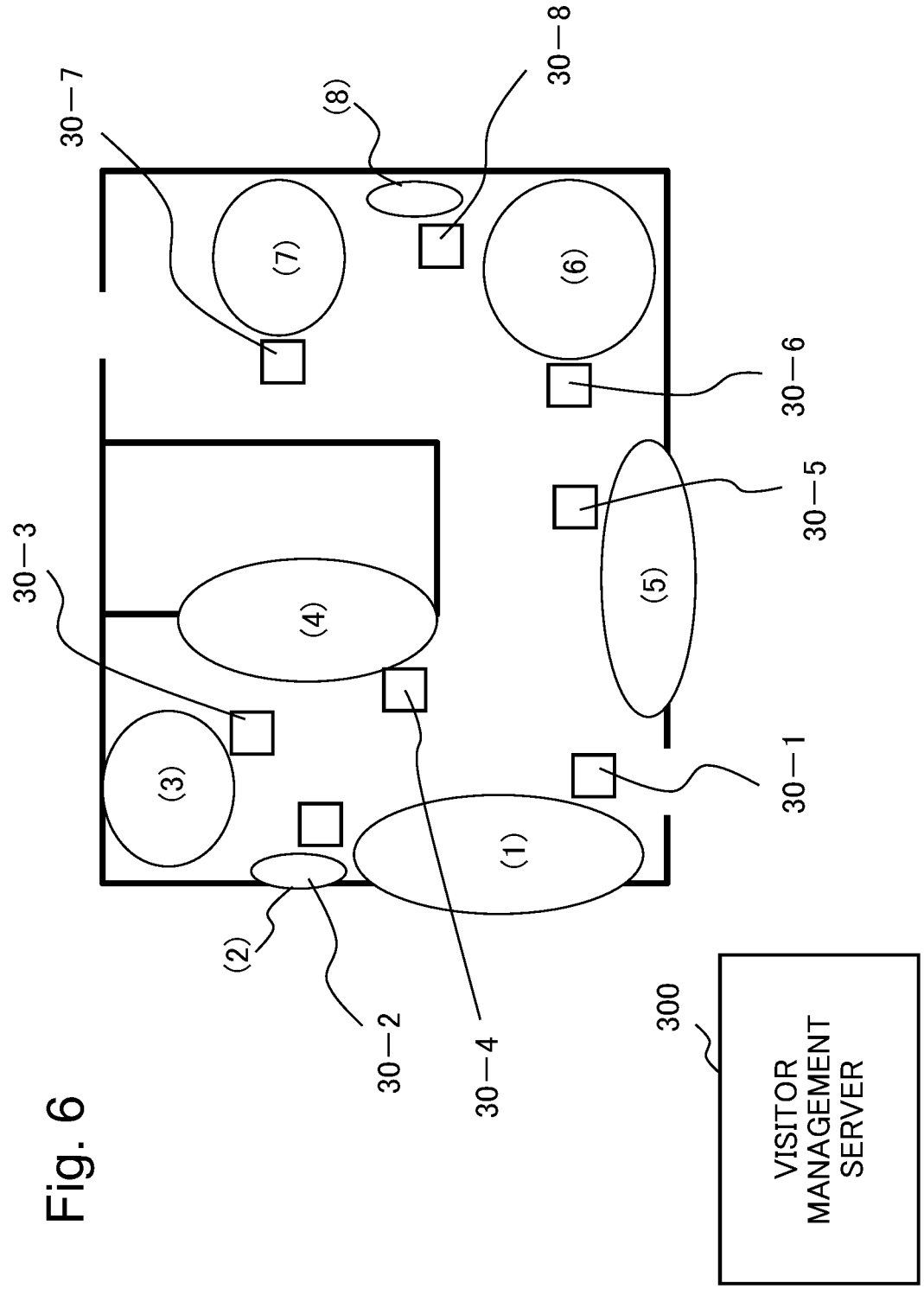
FIG. 6 is a diagram illustrating an example of how reading devices are arranged according to the first example embodiment of the present invention.

FIG. 6 is a diagram schematically illustrating a state in which reading devices 30-1 to 30-8 are installed in the booths, respectively. Hereinafter, in the description common to the reading devices 30-1 to 30-8, the reading devices 30-1 to 30-8 will be referred to as a reading device 30. The reading device 30 reads identification information indicated, for example, as a barcode on an attendance certificate distributed for each visitor, and transmits the read identification information to the visitor management server 300 via a network.

The reading device 30 may read identification information recorded in an integrated circuit (IC) card possessed by a visitor to acquire visitor identification information. Alternatively, the reading device 30 may be a device that reads visitor biological information. In a case where a device for reading visitor biological information is used, the visitor management server 300 holds feature data for each visitor in advance. Alternatively, the reading device 30 may acquire visitor information from a communication terminal device such as a smartphone possessed by a visitor.

Figure 7:
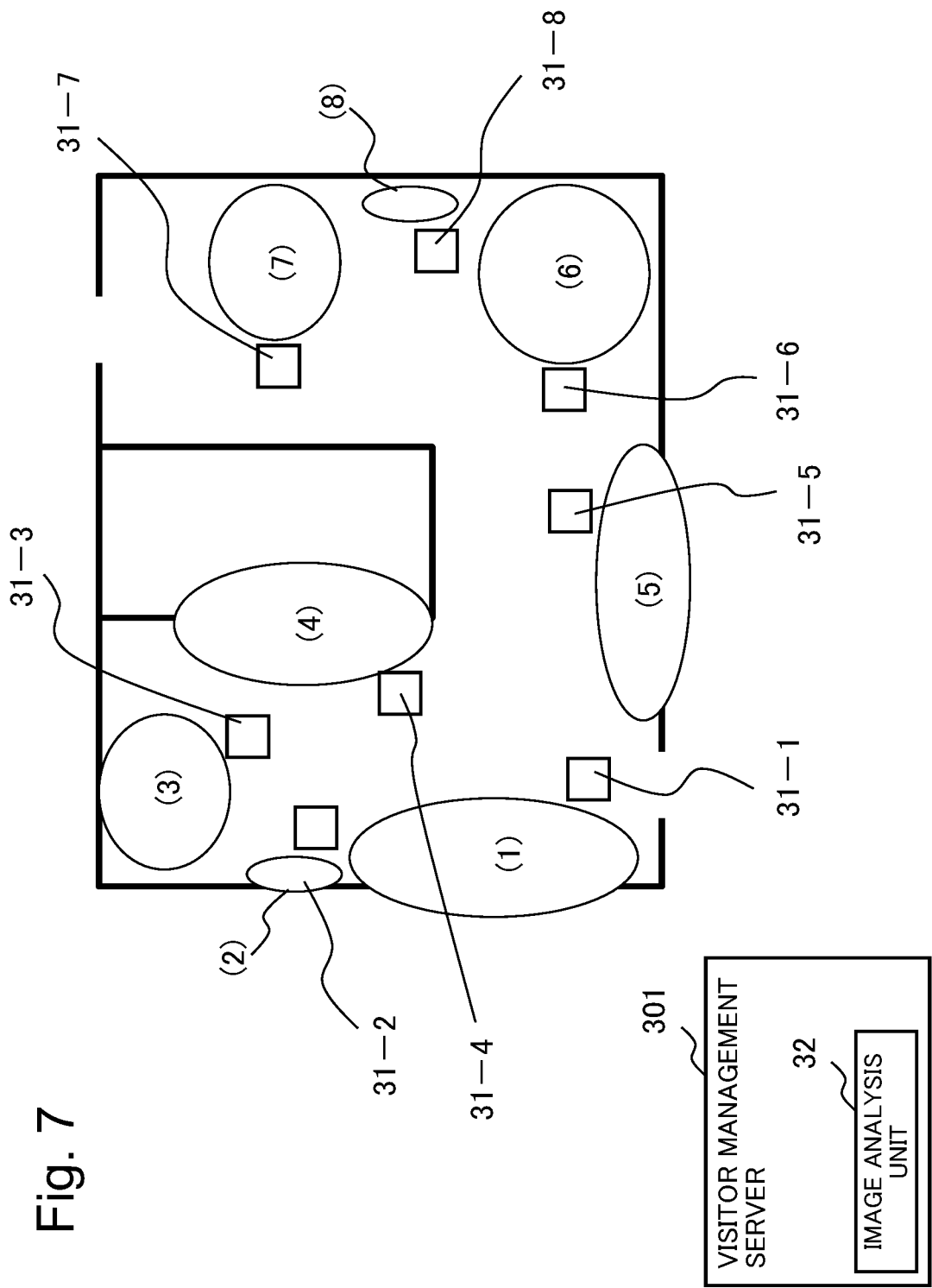
FIG. 7 is a diagram illustrating an example of how cameras are arranged according to the first example embodiment of the present invention.

In addition, the information on booths that the visitor has visited may be acquired by analyzing images obtained by imaging the inside of the exhibition hall. FIG. 7 is a diagram schematically illustrating a state in which cameras 31-1 to 31-8 are installed at entrances of booths, respectively, and a visitor management server 301 including an image analysis unit 32 is installed instead of the visitor management server 300. The visitor management server 301 acquires images captured by the cameras 31-1 to 31-8, and specifies a visitor by recognizing an image of a face of the visitor who has visited each booth through the image analysis unit 32. The information for identifying visitors to the exhibition and photograph data on visitors' faces are registered in advance. The visitor management server 301 stores a time at which a visitor has visited each booth in association with the visitor identification information, and transmits the time stored in association with the visitor identification information to the prediction model generation device 10 as time-series movement data about the visitor.

<Learning Phase>

Figure 8:
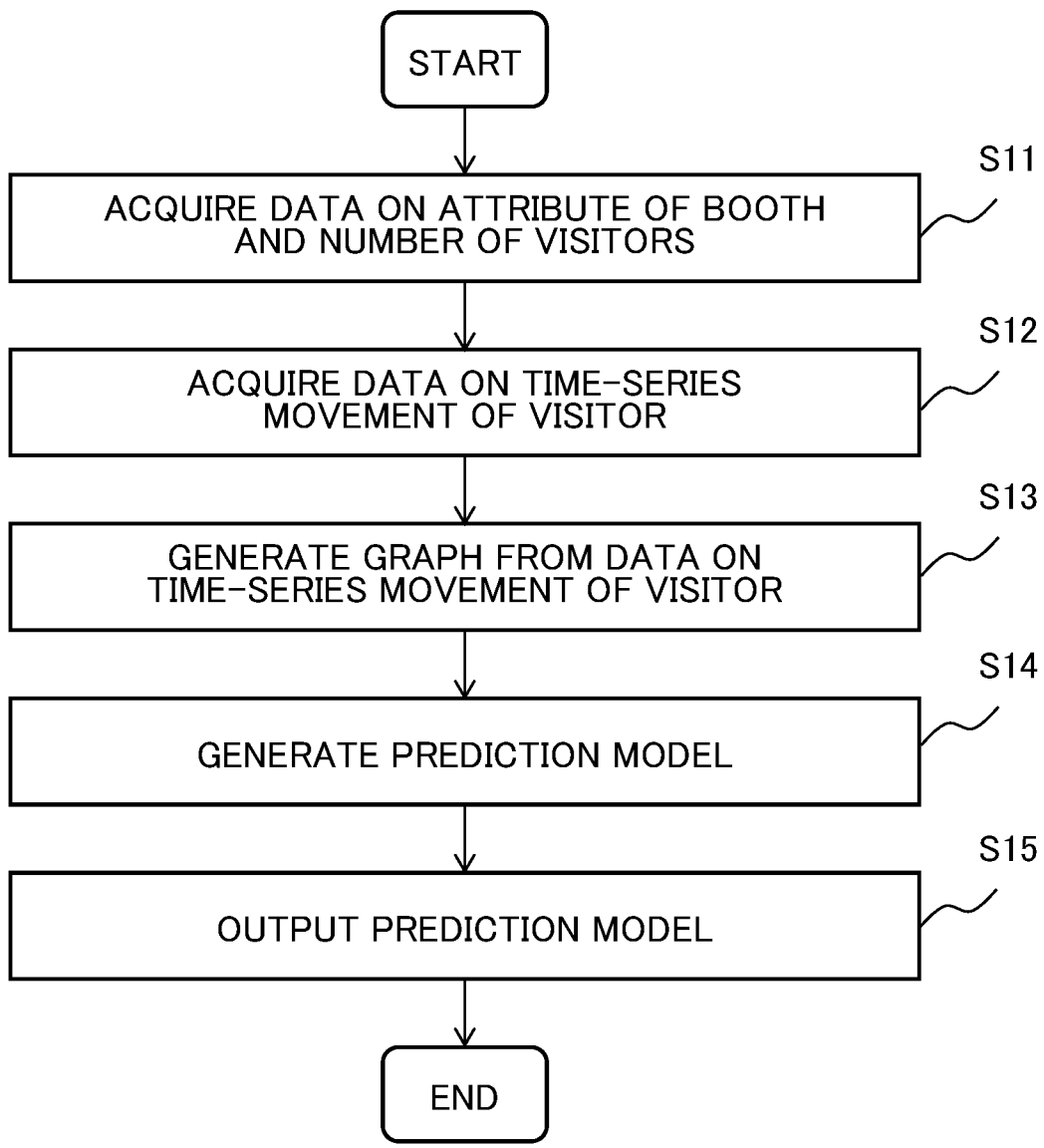
FIG. 8 is a diagram illustrating a flow of an operation of the prediction model generation device according to the first example embodiment of the present invention.

An operation of the person flow prediction system according to the present example embodiment will be described. First, an operation of the prediction model generation device 10 when generating a prediction model will be described. FIG. 8 is a diagram illustrating a flow of the operation of the prediction model generation device 10 when generating a prediction model.

The acquisition unit 11 acquires data on exhibition content for each booth and the number of visitors for each booth (step S11). Each piece of data may be input by an operator, or may be acquired from another server having each piece of data. When each piece of data is acquired, the acquisition unit 11 stores each piece of the acquired data in the storage unit 12.

FIG. 9 is a diagram illustrating an example of data on exhibition content for each booth. In the example of FIG. 9, a booth number indicating booth identification information and an exhibition form are associated with classification that is information indicating a field of a product or a service presented to a visitor. In addition, FIG. 10 illustrates the number of visitors to each booth and the classification of a seminar held in Booth 6 for each time.

The acquisition unit 11 acquires data on time-series movement between booths for each visitor from the visitor management server 300 (step S12). When the time-series movement data is acquired, the acquisition unit 11 stores the acquired time-series movement data in the storage unit 12.

FIG. 11 is a diagram illustrating an example of booth visit history data for each visitor. In the example of FIG. 11, visitor identification information is associated with information on a visited booth number and a time at which each booth was visited.

When the visit history data is stored in the storage unit 12, the graph generation unit 13 generates graph time-series data based on the booth visit history data (step S13). The graph generation unit 13 generates graph time-series data in which nodes are connected to each other by edges according to time-series visits, the nodes indicating booths a visitor has visited and the edges indicating a route along which the visitor has moved. When the graph time-series data is generated, the graph generation unit 13 transmits the generated graph data to the prediction model generation unit 14.

When the graph time-series data is input, the prediction model generation unit 14 reads each piece of data used for generating a prediction model from the storage unit 12. When each piece of data is read, a prediction model for predicting a person flow in the exhibition is generated by machine learning using graph time-series data based on visit history for each visitor, an exhibition content of each booth, and the number of visitors to the booth as input data (step S14).

When the prediction model is generated, the prediction model generation unit 14 stores the generated prediction model in the prediction model storage unit 15. When the prediction model is stored, the prediction model output unit 16 outputs the prediction model to the prediction device 20 (step S15). The prediction model input to the prediction device 20 is stored in the prediction model storage unit 22.

The prediction model generated by the prediction model generation device 10 may be updated by re-learning. For example, the prediction model generation unit 14 updates the prediction model stored in the prediction model storage unit 15 by performing re-learning using graph time-series data generated from time-series movement data about a visitor, attribute data of exhibit, and the number of visitors for each booth during an initial period of the exhibition as input data. In addition, the prediction model output unit 16 outputs the prediction model to the prediction device 20. By performing re-learning as described above, prediction can be performed based on dynamic data, and as a result, accuracy of prediction can be further improved.

<Prediction Phase>

Figure 12:
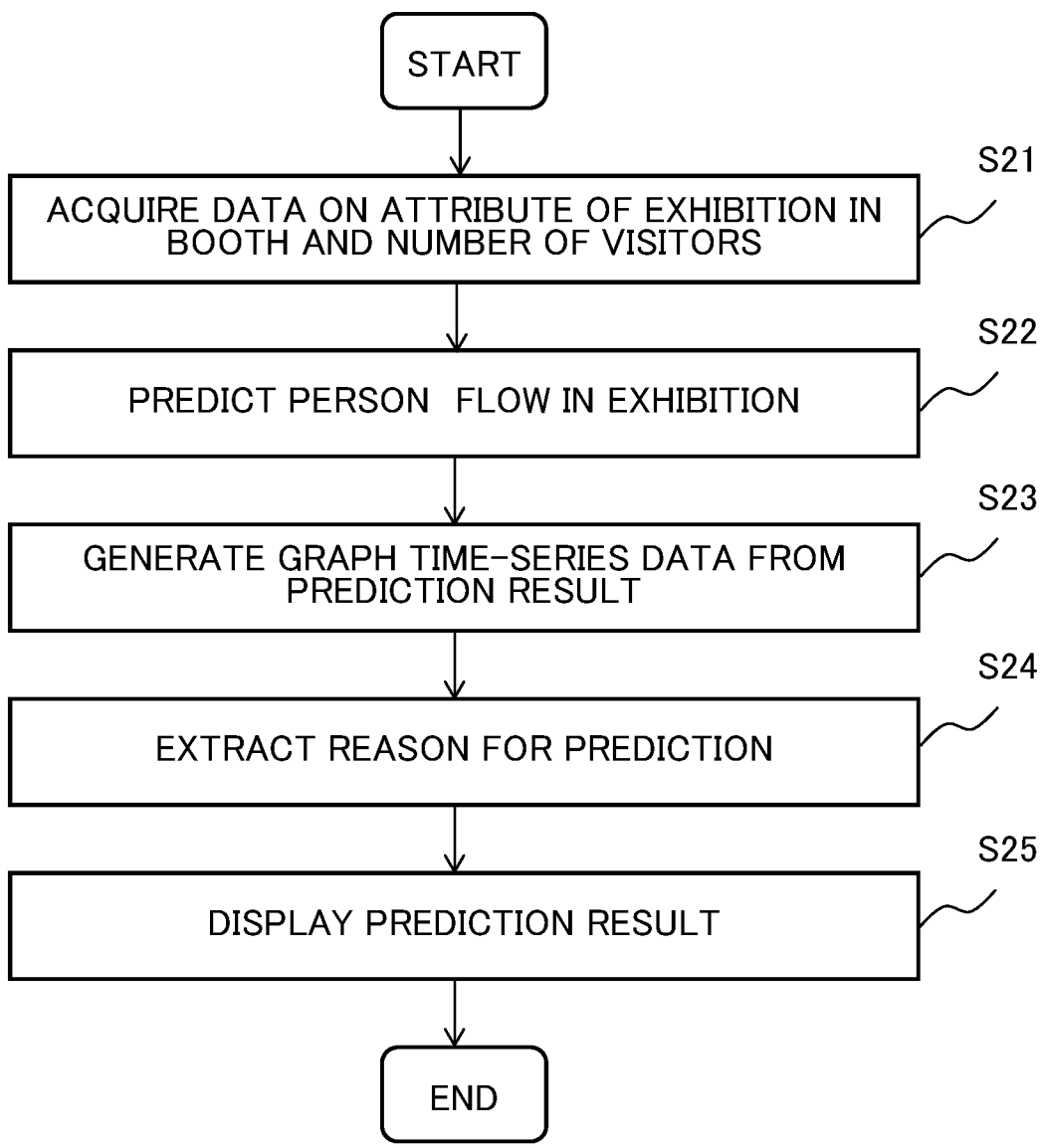
FIG. 12 is a diagram illustrating a flow of an operation of the prediction device according to the first example embodiment of the present invention.

Next, an operation of the prediction device 20 when predicting a person flow in the exhibition will be described. FIG. 12 is a diagram illustrating a flow of the operation of the prediction device 20 when predicting a person flow in the exhibition.

When the prediction of the person flow in the exhibition is started, the acquisition unit 21 acquires attribute data of exhibition in each booth and the number of visitors to each booth in the exhibition which is a prediction target (step S21). When each piece of data is acquired, the prediction unit 23 predicts a person flow in the exhibition using the prediction model, using the attribute data of exhibition and the number of visitors for each booth as inputs (step S22). When the person flow in the exhibition is predicted, the prediction unit 23 transmit a result of predicting the person flow in the exhibition to the graph generation unit 24. When the prediction result is received, the graph generation unit 24 generates graph time-series data (step S23). The graph generation unit 24 generates graph time-series data including nodes each indicating an exhibition that a visitor has visited and edges each indicating a visit order.

When the graph time-series data is generated, the prediction reason generation unit 25 extracts a reason for the prediction from the prediction result (step S24). For example, the prediction reason generation unit 25 extracts, from the prediction result, an edge having a higher degree of contribution than other edges in terms of a predicted visit order, that is, an edge having a large flow of persons than the other edges, when the prediction is performed using the prediction model. When the edge having a high degree of contribution is extracted from the prediction result, the prediction reason generation unit 25 extracts attribute data between nodes at both ends of the extracted edge as a reason for the prediction why the flow of persons between the two nodes is larger than those between other nodes. When the reason for the prediction is extracted, the prediction reason generation unit 25 outputs the reason for the prediction to the display control unit 26.

When the prediction result and the reason for the prediction, the display control unit 26 controls a display device to display the prediction result and the reason for the prediction on the display device (step S25). The display control unit 26 may control transmission of data on the prediction result and the reason for the prediction to a terminal of a user in such a way that the prediction result and the reason for the prediction are displayed on a display device of the terminal of the user who uses the prediction result.

Figure 13:
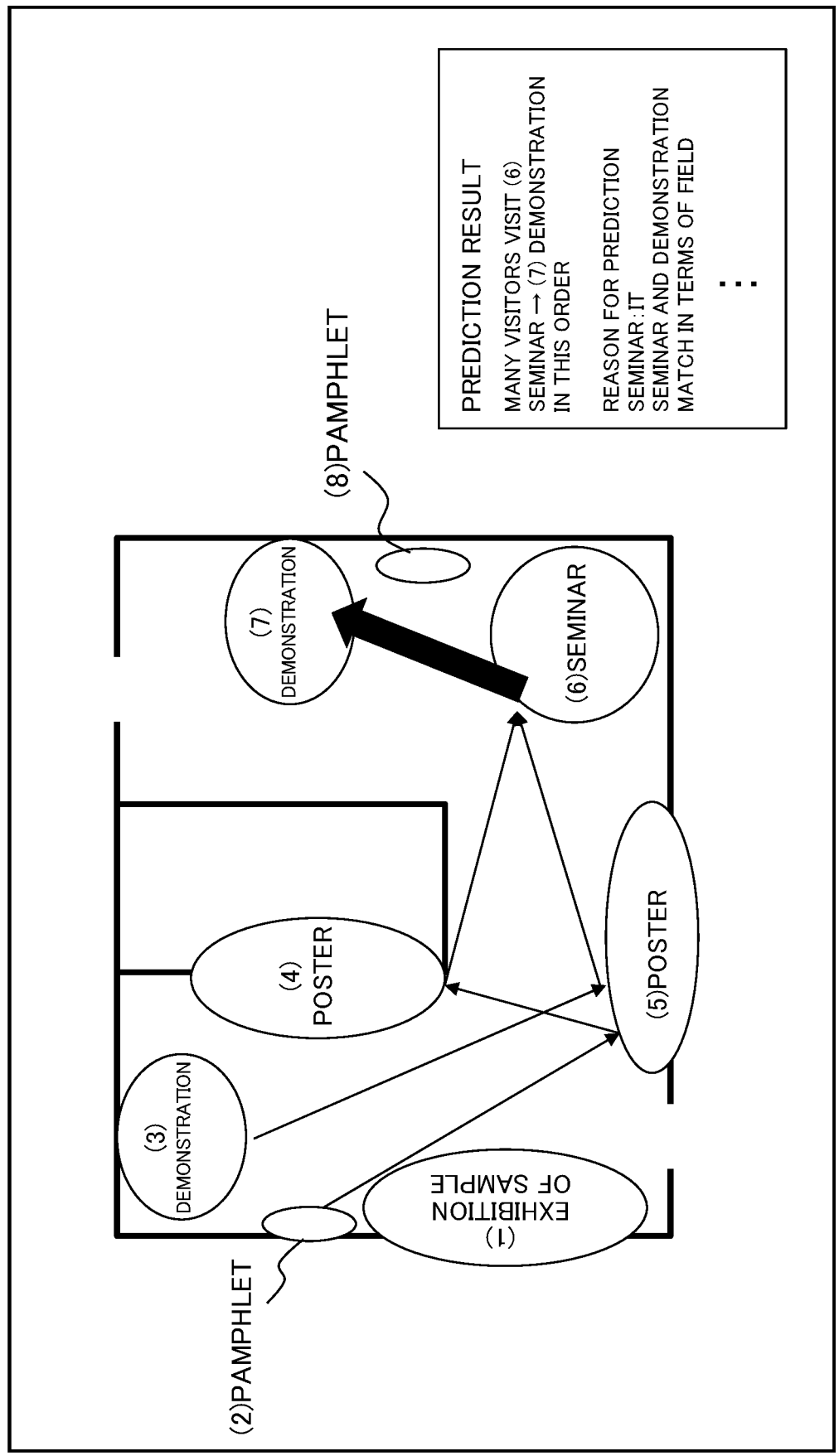
FIG. 13 is a diagram illustrating an example of a prediction result according to the first example embodiment of the present invention.

FIG. 13 is a diagram illustrating an example of prediction result display data. In the example of FIG. 13, on a map of an area in the exhibition, movements of visitors between nodes is indicated by thin arrows, and a person flow between nodes taken by more visitors than those between the other nodes is indicated by a thick arrow. In addition, in FIG. 13, an exhibition form such as demonstration, which is attribute data of each booth, is displayed in the booth. Data on another attribute of the booth may be displayed by placing a mouse cursor on the display of the attribute data of FIG. 13. Alternatively, data on another attribute of the booth may be displayed by clicking or tapping the attribute data of FIG. 13.

In FIG. 13, each booth is expressed by a node on the graph time-series data, and a movement route between booths indicated by an arrow is expressed by an edge on the graph time-series data. In addition, in the example of FIG. 13, many persons have moved between Booth 6 and Booth 7, and it is described as a reason that many persons have moved along a person flow between Booth 6 and Booth 7 when a seminar in the information technology (IT) field is being held in Booth 6.

As a reason for the prediction, the attribute data used for the prediction may be used as it is. When the exhibition form being a demonstration greatly contributes to the prediction result, the prediction reason generation unit 25 may extract, for example, that a demonstration is being performed as a reason for the prediction. Alternatively, the prediction reason generation unit 25 may present a reason for the prediction based on a template defined in advance. For example, the prediction reason generation unit 25 may hold a template "because the content of the seminar is XX", and generate a reason for the prediction "because the content of the seminar is IT" when the seminar in the time zone predicted to have a large flow of persons is in the "IT" field.

The prediction reason generation unit 25 may generate a proposal for a change in arranging exhibition articles in addition to the reason for the prediction. For example, when there is a large flow of persons between Booth 6 and Booth 7, the prediction reason generation unit 25 may generate an arrangement change proposal to increase a distance between Booth 6 and Booth 7. Furthermore, the prediction reason generation unit 25 may add a reason why the change has been proposed to the arrangement change proposal. For example, the prediction reason generation unit 25 adds, to the arrangement change proposal, the reason that there is a large flow of persons between Booth 6 and Booth 7, and thus, it is expected that the number of visitors to a booth arranged between Booth 6 and Booth 7 increases. In addition, a plurality of arrangement change proposal may be presented depending on what the reason for the prediction is. By presenting the arrangement change proposal together with the prediction result and the reason of the prediction, it is possible to present a more effective way to arrange exhibition articles to a user who uses the prediction result in an easy-to-understand format. The arrangement change proposal is displayed on a display device by the display control unit 26.

In addition, when the prediction result is displayed as illustrated in FIG. 13, if the user changes a position of each booth by operating a mouse, a person flow may be predicted again based on the changed arrangement. Furthermore, in a case where the prediction result includes a prediction result to which the changed arrangement is applied, only the update of the display data may be performed.

It has been described above that the visitor order information is used as edge information at the time of generating a prediction model and performing prediction using the prediction model, but instead of the visitor order information, at least one item of a movement route of a visitor, a time at which a visitor visited each booth, a time for which a visitor has stayed in each booth, the number of persons staying in each booth, and a time for movement between booths may be used.

As a reason for the prediction, instead of the tendency of movement between the booths, at least one item of an exhibition form in each booth, an exhibition content, an exhibition content for each time zone, the number of visitors to each booth, the number of persons staying in each booth, the number of persons moving between booths, an attribute of an exhibition participant, an attribute of a visitor, a record of a visitor's purchase, and a product purchased by a visitor may be used.

An area of the exhibition from which data used at the time of generating a prediction model is acquired may be different from an area that is a target for prediction using the prediction model. For example, assuming that the area that is a target for prediction using the prediction model is defined as a first area, and the area of the exhibition from which data used at the time of generating the prediction model is defined as a second area, the first area and the second area may be the same or different from each other. The data used at the time of generating the prediction model may be data acquired from a plurality of exhibitions. In a case where the data used at the time of generating the prediction model is acquired from a plurality of exhibitions, the plurality of exhibitions may be different in one or both of venue and exhibition content.

In the person flow prediction system according to the present example embodiment, the prediction model generation device 10 generates graph time-series data based on history of movement of a visitor to an exhibition. The prediction model generation device 10 generates a prediction model that predicts a person flow in the exhibition, by performing machine learning using graph time-series data, attribute data of each booth, and the number of visitors to each booth as inputs. In addition, the prediction device 20 predicts a person flow in the exhibition using the prediction model generated by the prediction model generation device 10. Furthermore, the prediction model generation device 10 generates a prediction model based on information that changes for each period. As a result, the person flow prediction system according to the present example embodiment can perform highly accurate prediction even when circumstances change with time. Therefore, the person flow prediction system according to the present example embodiment can improve accuracy in predicting a person flow in a case where circumstances change with time, and improve cost effectiveness in exhibiting exhibition articles or the like and optimize the person flow according to a result of predicting the person flow.

The person flow prediction system according to the present example embodiment visually shows the person flow when outputting the prediction result. Therefore, the person flow prediction system according to the present example embodiment can provide information regarding one or more arrangement change proposals based on the person flow and reasons therefor in a format that is intuitively understandable by the user.

Second Example Embodiment

Figure 14:
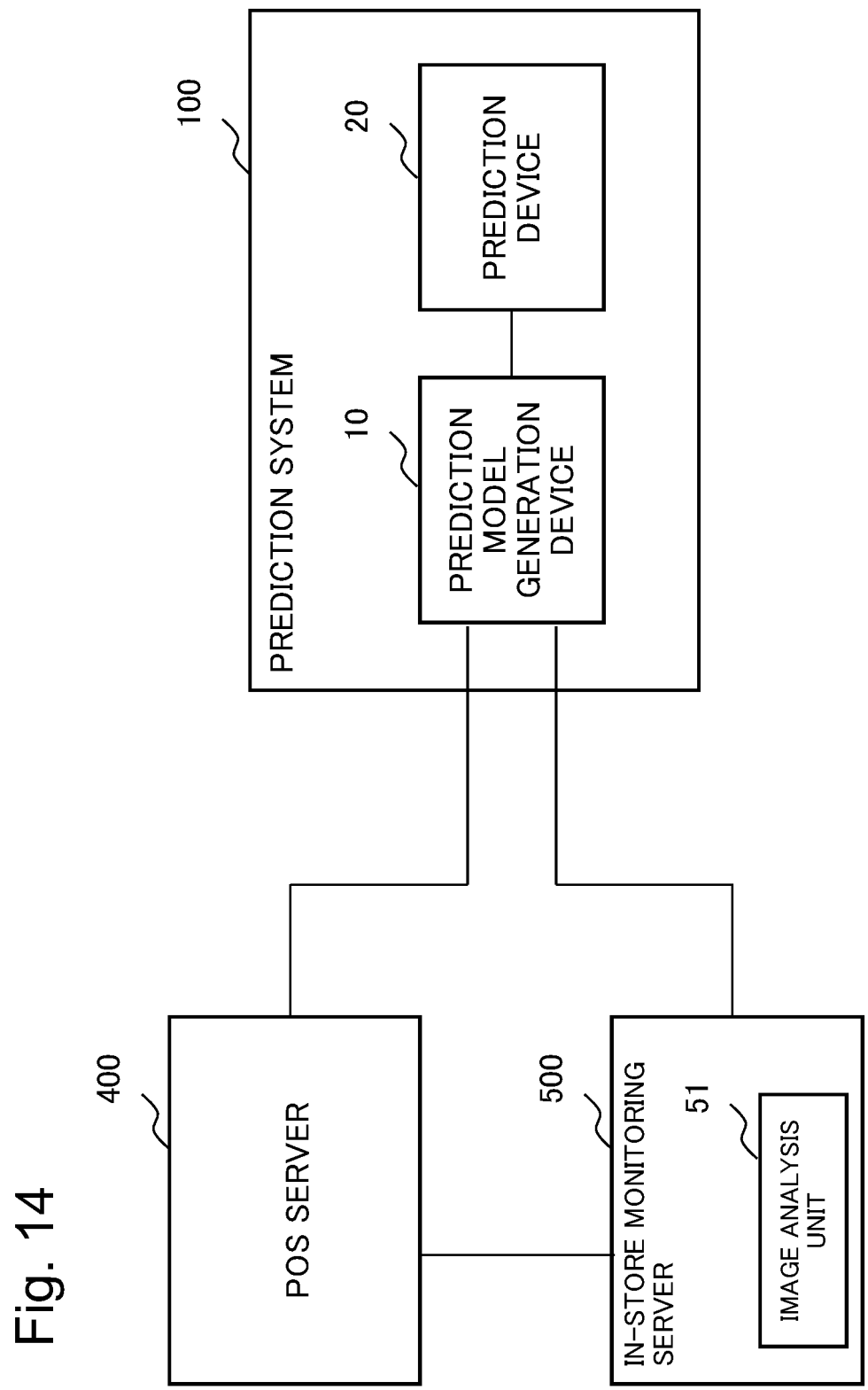
FIG. 14 is a diagram illustrating a configuration of a person flow prediction system according to a second example embodiment of the present invention.

A second example embodiment of the present invention will be described in detail with reference to the drawings. FIG. 14 is a diagram illustrating an outline of a configuration of a person flow prediction system according to the present example embodiment. The prediction system according to the present example embodiment includes a prediction system 100, a point of sale (POS) server 400, and an in-store monitoring server 500. The prediction system 100, the POS server 400, and the in-store monitoring server 500 are connected to each other via a network.

In the first example embodiment, a prediction model for predicting a person flow in the exhibition is generated and prediction is performed by acquiring time-series movement data about a visitor based on information when received in a booth of an exhibition. In the person flow prediction system according to the present example embodiment, a prediction model is generated based on data specifying a route of a store visitor based on information obtained by capturing images using cameras in a store to predict a flow of a person having a high degree of contribution to a rise in purchase amount.

Figure 15:
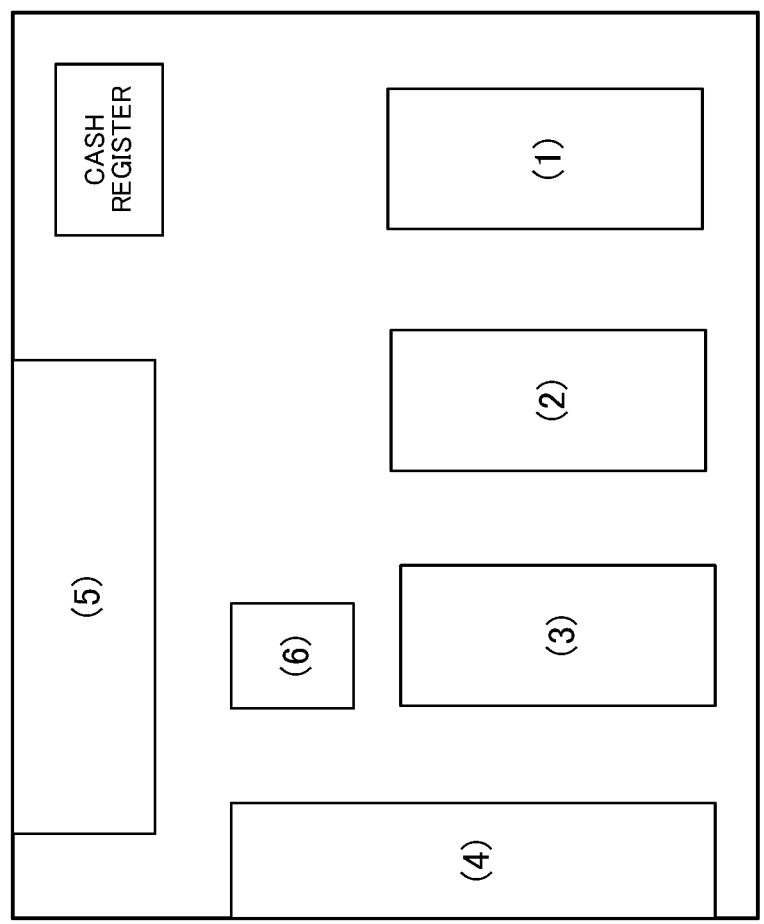
FIG. 15 is a diagram illustrating an example of a layout of a store for which a person flow is to be predicted according to the second example embodiment of the present invention.

FIG. 15 is a diagram schematically illustrating an example of a layout of product shelves in a store. FIG. 15 illustrates an example in which six product shelves are placed at respective positions in the store. Products to be sold are displayed on each of the product shelves. In FIG. 15, a store visitor can freely move between the six product shelves. A number in brackets in FIG. 15 indicates a number for identifying a product shelf. The number of product shelves may be other than six.

The configuration of the prediction system 100 is similar to that in the first example embodiment. Therefore, the prediction system 100 will be described below with reference to FIGS. 3 and 5 as well.

The POS server 400 is a server that manages data on sales, product stocks, etc. in the store. The POS server 400 transmits information on product purchase amount for each store visitor, together with identification information assigned for each store visitor, to the prediction model generation device 10. In addition, when a store visitor performs payment, the POS server 400 acquires image data about the store visitor, and adds the identification information assigned for each store visitor to the image data about the store visitor who has performed payment. The POS server 400 transmits the identification information and the image data about the store visitor who has performed payment to the in-store monitoring server 500.

The in-store monitoring server 500 specifies a route along which a store visitor has moved in the store. For example, the in-store monitoring server 500 records the numbers of shelves before which the store visitor has stopped and generates history data. The in-store monitoring server 500 specifies the store visitor from the image data using an image analysis unit 51. In addition, the in-store monitoring server 500 acquires data on an image of a face of a person who has performed payment and identification information about that person from the POS server 400. The in-store monitoring server 500 specifies history data matching the person who has performed payment. The in-store monitoring server 500 generates history data in which the movement history about the store visitor is associated with the identification information about the store visitor. The in-store monitoring server 500 transmits the generated history data to the prediction model generation device 10.

Figure 16:
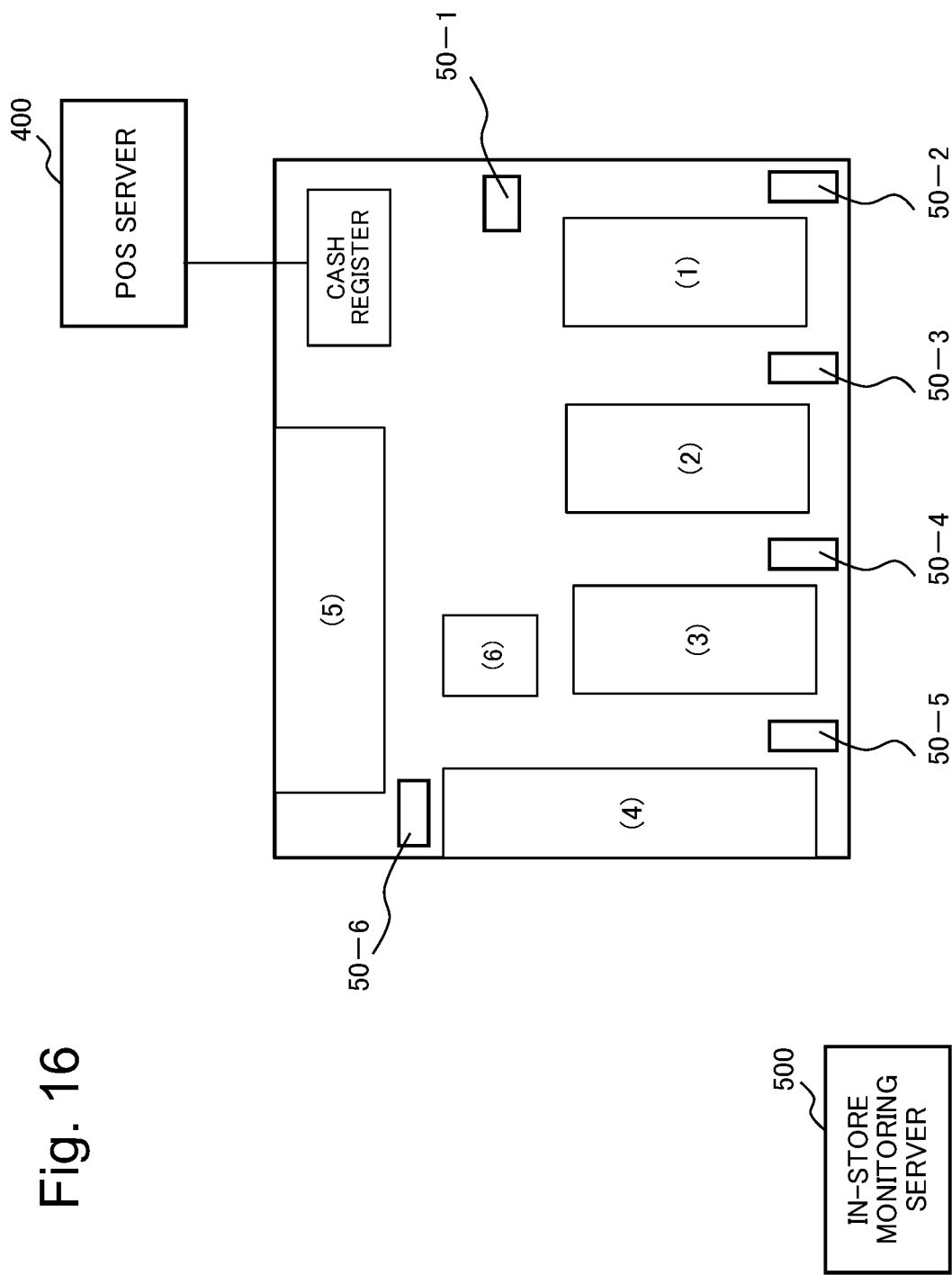
FIG. 16 is a diagram illustrating an example of how cameras are arranged according to the second example embodiment of the present invention.

FIG. 16 is a diagram schematically illustrating a state in which cameras 50-1 to 50-6 are installed at respective positions in the store. Hereinafter, in the description common to the cameras 50-1 to 50-6, the cameras 50-1 to 50-6 will be referred to as a camera 50. The camera 50 is installed to be capable of imaging a store visitor standing in front of each product shelf. The camera 50 may be attached to each product shelf. The camera 50 transmits the captured image data to the in-store monitoring server 500 via a network.

<Learning Phase>

Figure 17:
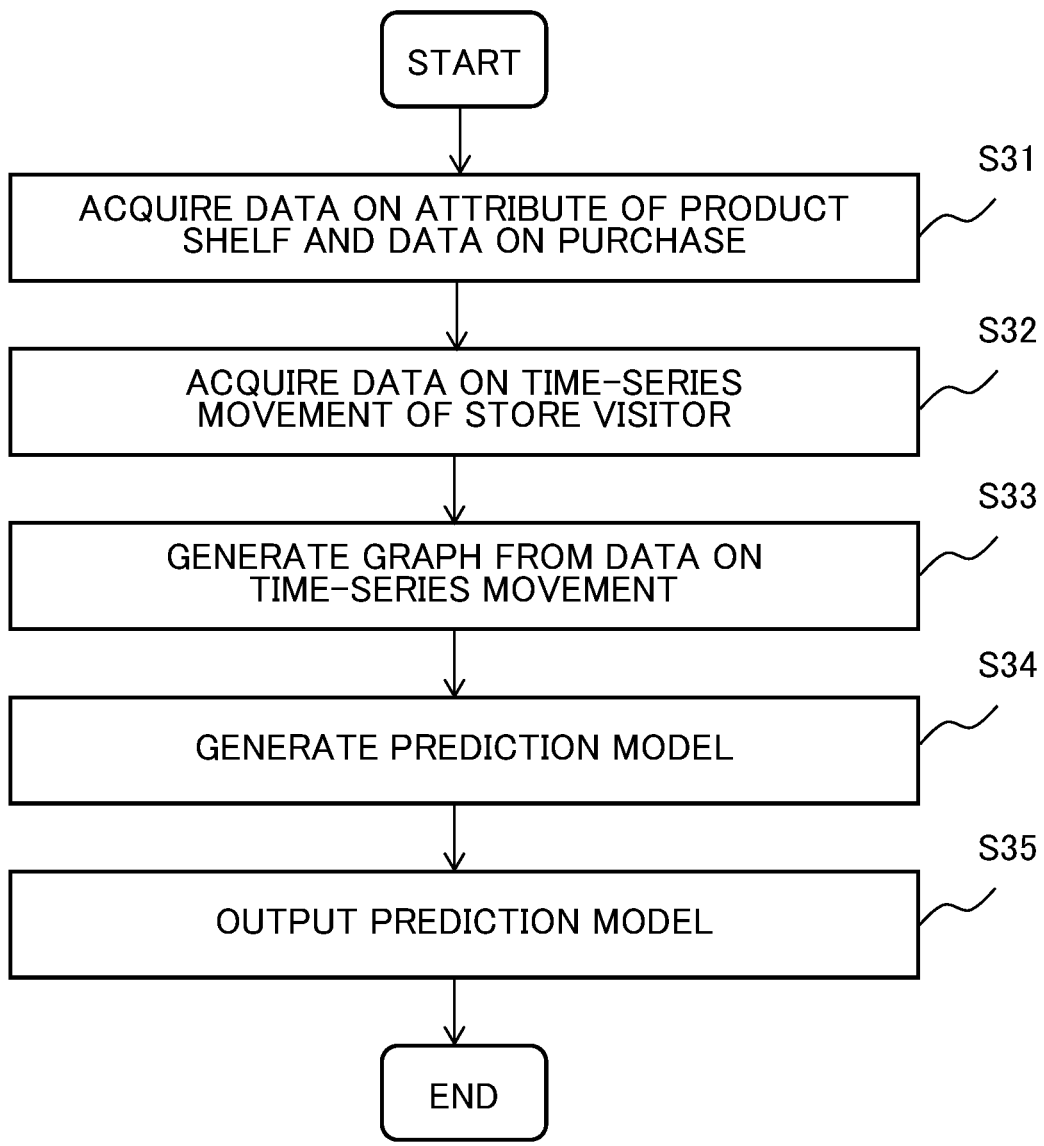
FIG. 17 is a diagram illustrating a flow of an operation of a prediction model generation device according to the second example embodiment of the present invention.

An operation of the person flow prediction system according to the present example embodiment will be described. First, an operation of the prediction model generation device 10 when generating a prediction model for predicting a movement route of a store visitor causing a high purchase amount will be described. FIG. 17 is a diagram illustrating a flow of the operation of the prediction model generation device 10 when generating a prediction model.

The acquisition unit 11 acquires, from the POS server 400, data on the classification of products displayed on each product shelf, the classification of products on a special corner, and a purchase amount for each store visitor (step S31). When each piece of data is acquired, the acquisition unit 11 stores each piece of the acquired data in the storage unit 12.

In addition, the acquisition unit 11 acquires the identification information and the time-series movement data indicating the movement history in the store about the store visitor from the in-store monitoring server 500 (step S32). When the identification information and the time-series movement data about the store visitor are acquired, the acquisition unit 11 stores the acquired identification information and time-series movement data about the store visitor in the storage unit 12.

FIG. 18 illustrates an example of data on the type of products displayed on each product shelf. In FIG. 18, a product shelf identification number indicated as a product shelf is associated with the type of displayed products. Furthermore, FIG. 19 illustrates an example of data on products displayed on the special corner of Product shelf 6 of FIG. 18 during each period. In FIG. 19, a period is associated with products displayed on the special corner during that period. In addition, FIG. 20 illustrates an example of data on product purchase amount for each store visitor. In FIG. 20, store visitor identification information is associated with a purchase amount.

When the acquired identification information and time-series movement data about the store visitor are stored in the storage unit 12, the graph generation unit 13 generates a graph based on the time-series movement data about the store visitor. The graph generation unit 13 generates a graph in which a product shelf is indicated by a node and a movement route of a store visitor between nodes is indicated by an edge. The movement route is information indicating a relationship between a source node and a destination node concerning the movement of the store visitor, and it does not matter which route the store visitor actually moves along among a plurality of routes in the store. When the graph is generated, the graph generation unit 13 transmits the generated graph structure data to the prediction model generation unit 14.

Figure 22:
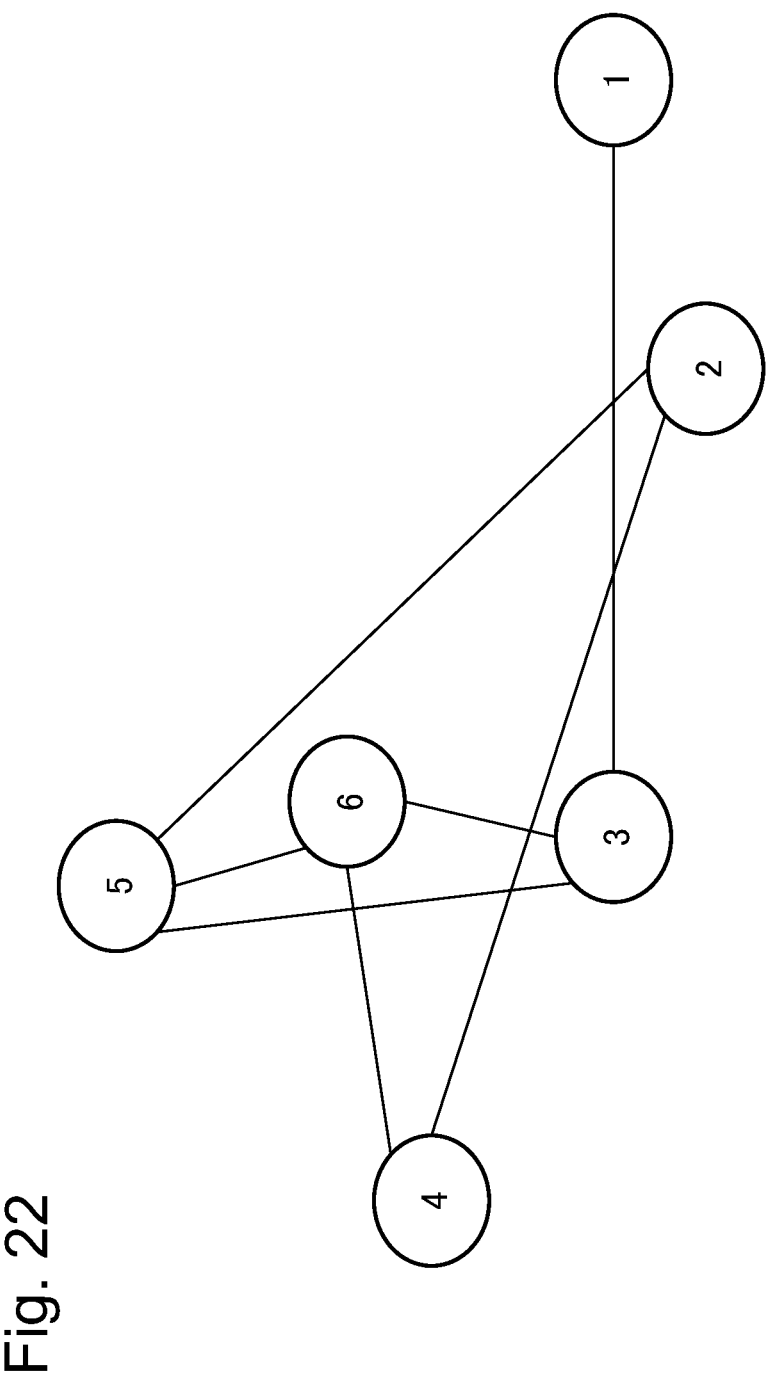
FIG. 22 is a diagram schematically illustrating an example of a graph according to the second example embodiment of the present invention.

FIG. 21 is a diagram illustrating an example of time-series movement data about a store visitor. In FIG. 21, identification information about a store visitor is associated with information on store visit date and product shelves before which the store visitor has stopped. FIG. 22 is a diagram schematically illustrating an example of a graph generated by the graph generation unit 13. In FIG. 22, movement histories of a plurality of store visitors illustrated in FIG. 21 are collectively shown as one graph. In FIG. 22, a circle indicates each product shelf set as a node. A number in the circle indicates a number for identifying product shelf. In addition, in FIG. 22, a straight line connecting the product shelves, which are indicated by nodes, indicates a movement of a store visitor set as an edge.

When the graph structure data is input, the prediction model generation unit 14 reads each piece of data used for generating a prediction model from the storage unit 12. When each piece of data is read, the prediction model generation unit 14 generates a prediction model for predicting a behavior of a store visitor having a high purchase amount, using graph time-series data on movement history for each store visitor, classifications of products handled on product shelves, and a product on a special corner for each time as input data, and using a purchase amount for each store visitor as a label (step S34). The prediction model generation unit 14 generates a prediction model using a method similar to that in the first example embodiment.

When the prediction model is generated, the prediction model generation unit 14 stores the generated prediction model in the prediction model storage unit 15. When the prediction model is stored, the prediction model output unit 16 outputs the prediction model to the prediction device 20 (step S35). The prediction model input to the prediction device 20 is stored in the prediction model storage unit 22.

The prediction model generation unit 14 may update the prediction model by re-learning, similarly to the first example embodiment. For example, the prediction model generation unit 14 updates the prediction model, using graph time-series data generated from time-series movement data about a store visitor on the day as an input, and using a purchase amount for each store visitor as a label.

<Prediction Phase>

Figure 23:
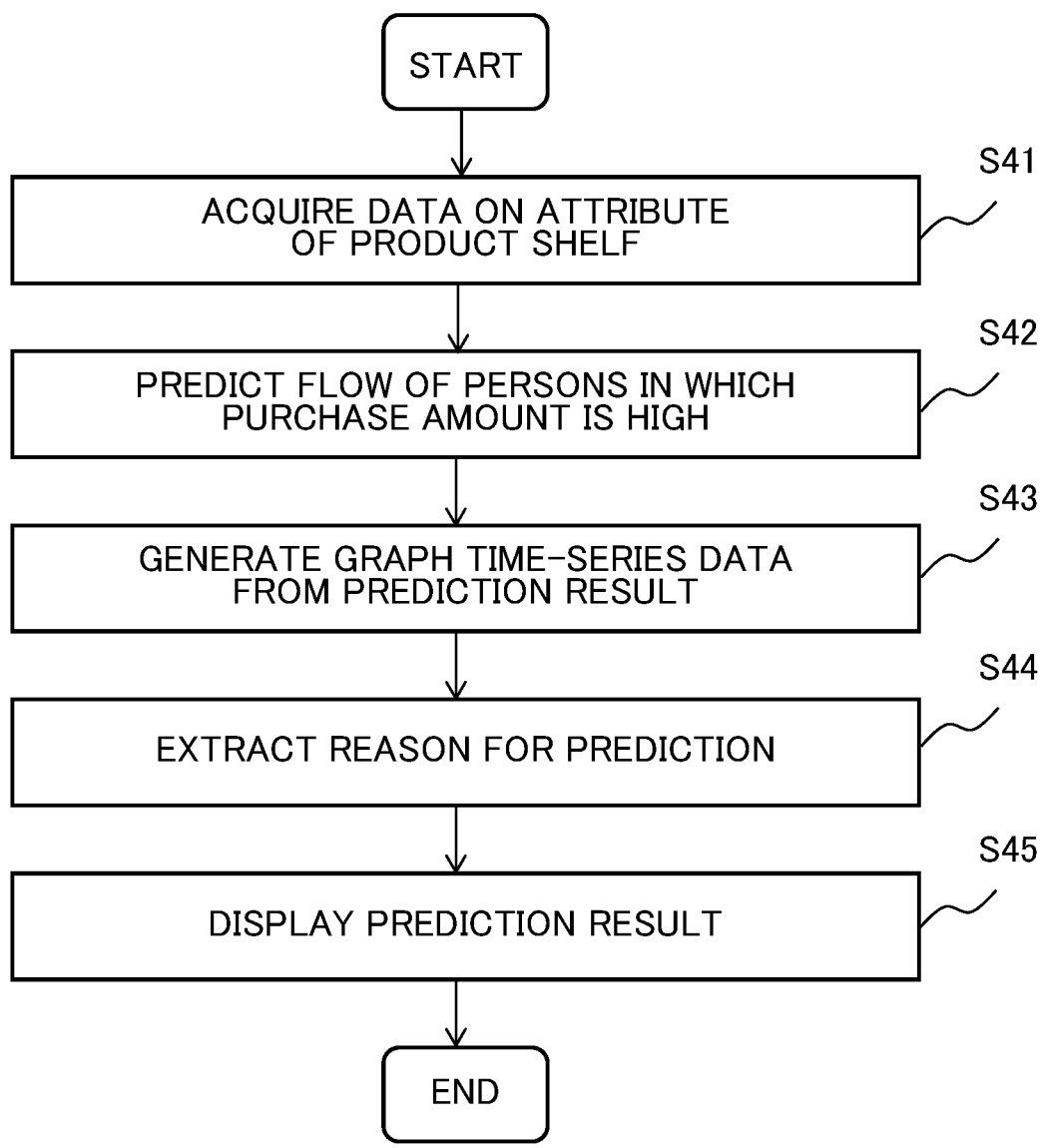
FIG. 23 is a diagram illustrating a flow of an operation of a prediction device according to the second example embodiment of the present invention.

Next, an operation of the prediction device 20 when predicting a behavior of a store visitor having a high purchase amount will be described. FIG. 23 is a diagram illustrating a flow of the operation of the prediction device 20 when predicting a behavior of a store visitor having a high purchase amount.

The acquisition unit 21 acquires data on types of products handled on product shelves and a product handled on a special corner (step S41). When the data is acquired, the prediction unit 23 predicts a person flow causing a high purchase amount using the prediction model, with the data on types of products handled on product shelves and a product handled on a special corner as inputs (step S42).

When a flow of a person having a high purchase amount is predicted, the prediction unit 23 transmits a prediction result to the graph generation unit 24. When the prediction result is received, the graph generation unit 24 generates graph time-series data (step S43). The graph generation unit 24 generates graph time-series data including nodes each indicating a product shelf before which the store visitor has stopped and edges each indicating a movement order between product shelves.

When the graph time-series data is generated, the prediction reason generation unit 25 extracts a reason for the prediction from the prediction result (step S44). For example, when the prediction model predicts a person flow based on purchase amount from data from the prediction result, the prediction reason generation unit 25 extracts an edge having a higher degree of contribution to the prediction result than other edges. When an edge having a high degree of contribution to the prediction result is extracted, the prediction reason generation unit 25 extracts a route corresponding to the edge and types of product shelves at both ends of the route as a reason for predicting a person flow causing a high purchase amount. When the reason for the prediction is extracted, the prediction reason generation unit 25 outputs the reason for the prediction to the display control unit 26.

When the prediction result and the reason for the prediction, the display control unit 26 controls a display device to display the prediction result and the reason for the prediction on the display device (step S45). The display control unit 26 may control transmission of data on the prediction result and the reason for the prediction to a terminal of a user in such a way that the prediction result and the reason for the prediction are displayed on a display device of the terminal of the user who uses the prediction result.

Figure 24:
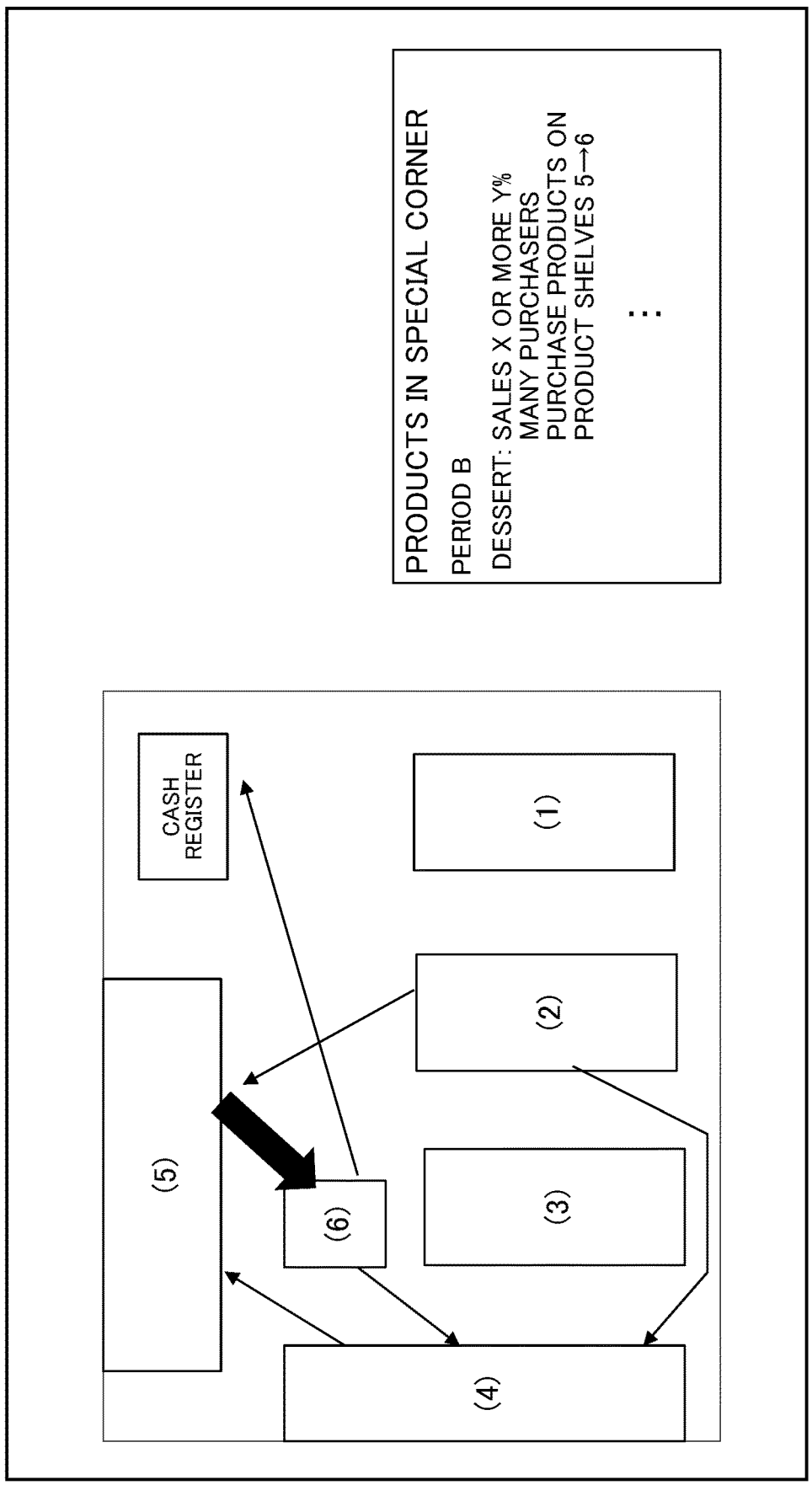
FIG. 24 is a diagram illustrating an example of a prediction result according to the second example embodiment of the present invention.

FIG. 24 is a diagram illustrating an example of prediction result display data. In the example of FIG. 24, on a map of the inside of the store, movement routes of store visitors each having a high purchase amount are indicated by thin arrows, and one of the movement routes having a high contribution to a rise in purchase amount is indicated by a thick arrow. In addition, in the example of FIG. 24, it is described as a reason that a purchase amount of a person who has moved from Product shelf 5 to Product shelf 6 is high when a dessert is being sold on a special corner.

It has been described above that, at the time of generating a prediction model and at the time of performing prediction using the prediction model, the type of products displayed on each product shelf and a product on the special corner for each period, which are attribute data of nodes, are used as input data. In addition to such data, the attribute data may include at least one or more item of other product information or store visitor information, such as a product category, a product name, a product brand, a manufacturer of a product, a scale of a manufacturer, a name value of a manufacturer, whether a product is advertised, an arrangement position in a product shelf, a sales record for each product, an age of a store visitor, a gender of a store visitor, and the number of accompanying store visitors, but the attribute data is not limited thereto, and any data relating to attributes of products arranged on the product shelves may be used. For example, in a case where the product is a food product, raw materials and allergen labeling are also included in the attribute data. The product category indicates a category such as "meat", "vegetable", or "fish", for example, in a case where the product is a food product. In addition, a product placed in a special booth for each period is used as input data, but data that changes for each time in one day may be input. For example, data such as the number of remaining lunch boxes may be used as input data.

In addition, it has been described above that the purchase amount is used as a label, but instead of the purchase amount, at least one item of index data such as the number of product shelves before which a store visitor has stopped, the number of purchased products, whether a specific product is purchased, whether a combination of specific types of products is purchased, whether a coupon is used, and the number of store visits may be used.

Similarly to the first example embodiment, a store from which data used at the time of generating a prediction model is acquired may be different from a store that is a target for prediction using the prediction model. The data used at the time of generating a prediction model may be data acquired when different products were arranged in the same store. In addition, similarly to the first example embodiment, a prediction model for predicting a person flow in a store may be generated without using a label during learning, and a person flow may be predicted using such a prediction model.

The configuration of the present example embodiment, in which data on movement history about a store visitor is acquired from image data obtained by capturing images using the cameras 50, may be used at the time of acquiring data on movement history about a visitor to exhibitions in the first example embodiment.

In the person flow prediction system according to the present example embodiment, a graph is generated from movement histories of store visitors acquired from images data obtained by capturing images using the cameras 50, and a prediction model is generated by learning based on graph structure data. Therefore, even when the store visitor does not take an action for causing identification information to be read, prediction can be performed with high accuracy based on the prediction model generated from the movement history.

Third Example Embodiment

Figure 25:
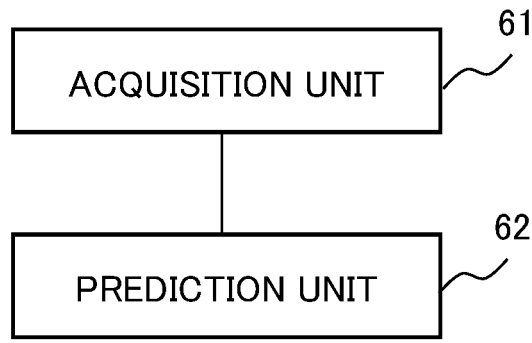
FIG. 25 is a diagram illustrating a configuration of a person flow prediction system according to a third example embodiment of the present invention.
Figure 26:
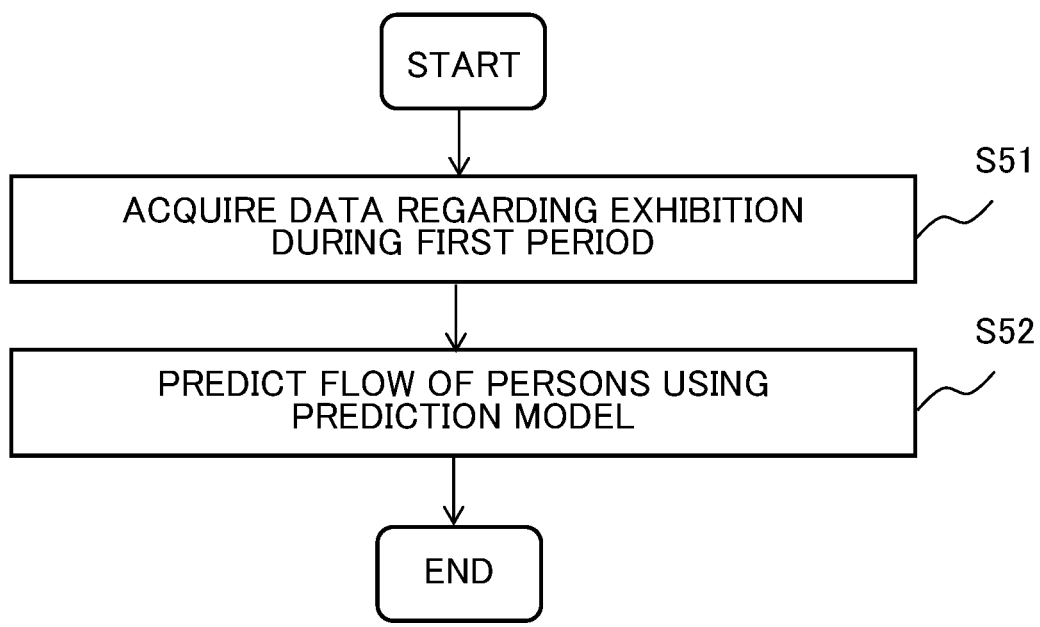
FIG. 26 is a diagram illustrating a flow of an operation of the person flow prediction system according to the third example embodiment of the present invention.

A third example embodiment of the present invention will be described in detail with reference to the drawings. FIG. 25 is a diagram illustrating a configuration of a person flow prediction system according to the present example embodiment. FIG. 26 is a diagram illustrating an operation flow of the person flow prediction system according to the present example embodiment.

The person flow prediction system according to the present example embodiment is a person flow prediction system that predicts a person flow in an exhibition hall where a plurality of exhibition articles are exhibited, and includes an acquisition unit 61 and a prediction unit 62. The acquisition unit 61 and the prediction unit 62 may be provided in a single device or may be provided in different devices.

The acquisition unit 61 acquires attribute data about a plurality of exhibits in a first period. As an example of the acquisition unit 61, the acquisition unit 21 of the prediction device 20 in the first example embodiment may be used.

The prediction unit 62 predicts a future person flow to the plurality of exhibits by inputting the attribute data acquired by the acquisition unit 61 to a prediction model that has been generated using machine learning with attribute data for a second period that is a period previous to the first period, graph time-series data regarding a time-series change in movement pattern for each of a plurality of visitors to the plurality of exhibits during the second period, and the number of visitors to each exhibition as inputs. Specifically, the first period refers to a period during which an exhibition that is a prediction target is held. In addition, the second period refers to a period during which attribute data and graph time-series data used to generate a prediction model are acquired, that is, a period during which an exhibition was held in the past. As an example of the prediction unit 62, the prediction unit 23 of the prediction device 20 in the first example embodiment may be used.

An operation of the person flow prediction system according to the present example embodiment will be described. First, the acquisition unit 61 acquires attribute data about a plurality of exhibits in an exhibition hall where the plurality of exhibition articles are exhibited in a first period (step S51). When the attribute data is acquired, the prediction unit 62 predicts a future person flow of a visitor to the plurality of exhibits by inputting the attribute data acquired by the acquisition unit 61 to the prediction model (step S52). The prediction model is generated based on the attribute data for the second period that is a period previous to the first period, and the graph time-series data regarding a time-series change in movement pattern for each of a plurality of visitors to the plurality of exhibits during the second period Specifically, the graph time-series data regarding a time-series change in movement pattern of a visitor refers to data in which a history of visitor's visits to exhibits in the exhibition hall is indicated by information on visited exhibits and information indicating the visited exhibits in time series.

In the person flow prediction system according to the present example embodiment, the acquisition unit 61 acquires attribute data of exhibits in the first period, and the prediction unit 62 predicts a person flow in the first period from the attribute data of exhibits in the first period, using a prediction model generated based on the attribute data of exhibits in the second period, which is a past period, and the graph time-series data on movement patterns of visitors to the exhibits. In the person flow prediction system according to the present example embodiment, since the prediction model based on the time-series movement histories of visitors is used, prediction can be performed in consideration of movement routes between a plurality of points, and accordingly, prediction can be performed even when the exhibition content or the like changes. As a result, the person flow prediction system according to the present example embodiment can improve accuracy of prediction even when circumstances change. Therefore, the person flow prediction system according to the present example embodiment can improve accuracy in predicting a person flow in a case where circumstances change with time, and improve cost effectiveness in exhibiting exhibition articles or the like and optimize the person flow according to a result of predicting the person flow.

Figure 27:
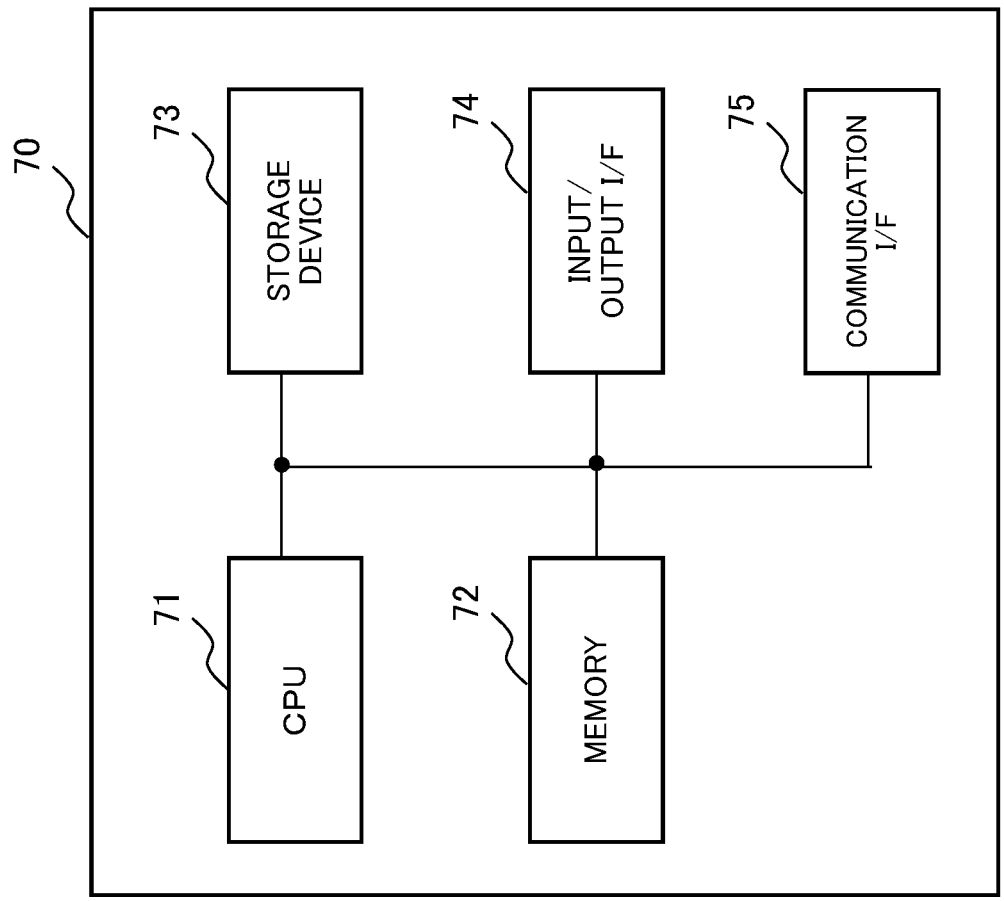
FIG. 27 is a diagram illustrating an example of another configuration of the present invention.

Processing by each of the prediction model generation device 10 and the prediction device 20 in the first and second example embodiments and processing by each of the acquisition unit 61 and the prediction unit 62 in the third example embodiment can be performed by executing a computer program using a computer. FIG. 27 illustrates an example of a configuration of a computer 70 that executes a computer program for performing processing by each of the prediction model generation device 10, the prediction device 20, the acquisition unit 61, and the prediction unit 62. The computer 70 includes a CPU 71, a memory 72, a storage device 73, an input/output interface (I/F) 74, and a communication I/F 75. Similarly, processing by the visitor management server 300 in the first example embodiment, and processing by each of the POS server 400 and the in-store monitoring server 500 in the second example embodiment can be performed by executing a computer program using a computer having the same configuration as the computer 70.

The CPU 71 reads a computer program for performing each processing from the storage device 73 and executes the computer program. The arithmetic processing unit that executes the computer program may be constituted by a combination of a CPU and a GPU instead of the CPU 71. The memory 72 is constituted by a dynamic random access memory (DRAM) or the like, and temporarily stores a computer program to be executed by the CPU 71 and data that is being processed. The storage device 73 stores a computer program to be executed by the CPU 71. The storage device 73 is constituted by, for example, a nonvolatile semiconductor storage device. As the storage device 73, another storage device such as a hard disk drive may be used. The input/output I/F 74 is an interface that receives an input from an operator and outputs display data and the like. The communication I/F 75 is an interface that transmits and receives data between each device in the person flow prediction system and a user terminal or the like.

In addition, the computer program used for executing each processing can be stored in a recording medium and distributed. As the recording medium, for example, a magnetic tape for recording data or a magnetic disk such as a hard disk can be used. Alternatively, an optical disk such as a compact disc read only memory (CD-ROM) can also be used as the recording medium. A non-volatile semiconductor storage device may also be used as the recording medium.

Some or all of the above-described example embodiments may be described as in the following supplementary notes, but are not limited to the following supplementary notes.

[Supplementary Note 1]

A person flow prediction system for predicting a person flow in an exhibition hall where a plurality of exhibition articles are exhibited, the person flow prediction system including:
 an acquisition means configured to acquire attribute data about a plurality of exhibits and the number of visitors to each of the plurality of exhibits in a first period; and
 a prediction means configured to predict a future person flow of a visitor to the plurality of exhibits by inputting the attribute data and the number of visitors to each of the plurality of exhibits acquired by the acquisition means to a prediction model generated using attribute data for a second period that is a period previous to the first period, graph time-series data regarding a time-series change in movement pattern for each of a plurality of visitors to the plurality of exhibits during the second period, and the number of visitors to each of the plurality of exhibits.

[Supplementary Note 2]

The person flow prediction system according to Supplementary Note 1, further including
 a display control means configured to control a display device to display a result of the prediction made by the prediction means and a reason for the prediction.

[Supplementary Note 3]

The person flow prediction system according to Supplementary Note 2, in which
 the display control means controls the display device to superimpose the result of the prediction made by the prediction means on a map of an area in which the plurality of exhibits are exhibited in the first period.

[Supplementary Note 4]

The person flow prediction system according to Supplementary Note 2 or 3, further including
 a graph generation means configured to generate graph time-series data indicating time-series changes in movement pattern of the plurality of visitors on a graph for the first period, based on the result of the prediction and graph data showing the graph including nodes indicating the plurality of exhibits, respectively, and edges each indicating that there is a visitor moving between the nodes in the first period,
 in which the display control means controls the display device to display the result of the prediction including the graph time-series data generated by the graph generation means.

[Supplementary Note 5]

The person flow prediction system according to Supplementary Note 4, further including
 a prediction report generation means configured to extract an edge having a higher degree of contribution to the result of the prediction than other edges and generate the reason for the prediction based on information about the extracted edge.

[Supplementary Note 6]

The person flow prediction system according to Supplementary Note 4 or 5, in which
 the display control means controls the display device to display display data indicating the attribute data about the exhibits associated to the respective nodes in the graph data in accordance with the graph time-series data generated by the graph generation means.

[Supplementary Note 7]

The person flow prediction system according to any one of Supplementary Notes 1 to 6, in which
 the graph time-series data includes at least one of a time at which each of the plurality of visitors visits each of the plurality of exhibits, an order in which each of the plurality of visitors visits the plurality of exhibits, and a time during which each of the plurality of visitors stays in the visited exhibit, in a predetermined period.

[Supplementary Note 8]

The person flow prediction system according to any one of Supplementary Notes 1 to 7, in which
 the attribute data includes at least one of an identifier of an exhibit, an exhibition position, an exhibition participation form, a field of an exhibition participation article, an exhibition participant, a business type that an exhibition participant is in, a business scale of an exhibition participant, the number of visitors that an exhibition participant attracted in the past, a sales record of a product associated with an exhibition participation article or an exhibition participation article, and a manufacturer of an exhibition participation article.

[Supplementary Note 9]

The person flow prediction system according to any one of Supplementary Notes 1 to 8, further including
 an image analysis means configured to generate data on a time-series movement pattern for each of the visitors used to generate the graph time-series data based on video data obtained by imaging the plurality of exhibits.

[Supplementary Note 10]

The person flow prediction system according to any one of Supplementary Notes 1 to 9, further including
 a prediction model generation means configured to generate the prediction model using machine learning, with the attribute data for the second period that is a period previous to the first period, the graph time-series data regarding a time-series change in movement pattern for each of the plurality of visitors to the plurality of exhibits during the second period, and the number of visitors to each of the exhibits as inputs.

[Supplementary Note 11]

The person flow prediction system according to Supplementary Note 10, in which
the prediction model generation means re-learns the prediction model based on the result of the prediction in the first period.

[Supplementary Note 12]

A person flow prediction method for predicting a person flow in an exhibition hall where a plurality of exhibition articles are exhibited, the person flow prediction method including:
acquiring attribute data about a plurality of exhibits and the number of visitors to each of the plurality of exhibits in a first period; and
predicting a future person flow of a visitor to the plurality of exhibits by inputting the attribute data and the number of visitors to each of the plurality of exhibits in the first period to a prediction model generated using attribute data for a second period that is a period previous to the first period, graph time-series data regarding a time-series change in movement pattern for each of a plurality of visitors to the plurality of exhibits during the second period, and the number of visitors to each of the plurality of exhibits.

[Supplementary Note 13]

The person flow prediction method according to Supplementary Note 12, further including
controlling an output to a display device to display a result of prediction of a person flow and a reason for the prediction.

[Supplementary Note 14]

The person flow prediction method according to Supplementary Note 13, further including
controlling the output to the display device to superimpose the result of the prediction on a map of an area in which the plurality of exhibits are exhibited in the first period.

[Supplementary Note 15]

The person flow prediction method according to Supplementary Note 13 or 14, further including:
generating graph time-series data indicating time-series changes in movement pattern of the plurality of visitors on a graph for the first period, based on the result of the prediction and graph data showing the graph including nodes indicating the plurality of exhibits, respectively, and edges each indicating that there is a visitor moving between the nodes in the first period; and
controlling the output to the display device to display the generated graph time-series data.

[Supplementary Note 16]

The person flow prediction method according to Supplementary Note 15, further including
extracting an edge having a higher degree of contribution to the result of the prediction than other edges, and generating the reason for the prediction based on information about the extracted edge.

[Supplementary Note 17]

The person flow prediction method according to Supplementary Note 15 or 16, further including:
controlling the output to the display device to display the attribute data about the exhibits associated to the respective nodes in the graph data in accordance with the graph time-series data.

[Supplementary Note 18]

The person flow prediction method according to any one of Supplementary Notes 12 to 17, in which
the graph time-series data includes at least one of a time at which each of the plurality of visitors visits each of the plurality of exhibits, an order in which each of the plurality of visitors visits the plurality of exhibits, and a time during which each of the plurality of visitors stays in the visited exhibit, in a predetermined period.

[Supplementary Note 19]

The person flow prediction method according to any one of Supplementary Notes 12 to 18, in which
the attribute data includes at least one of an identifier of an exhibit, an exhibition position, an exhibition participation form, a field of an exhibition participation article, an exhibition participant, a business type that an exhibition participant is in, a business scale of an exhibition participant, the number of visitors that an exhibition participant attracted in the past, a sales record of a product associated with an exhibition participation article or an exhibition participation article, and a manufacturer of an exhibition participation article.

[Supplementary Note 20]

The person flow prediction method according to any one of Supplementary Notes 12 to 19, in which
the graph time-series data is generated based on video data obtained by imaging the plurality of exhibits.

[Supplementary Note 21]

The person flow prediction method according to any one of Supplementary Notes 12 to 20, further including generating the prediction model using machine learning, with the attribute data for the second period that is a period previous to the first period, regarding a time-series change in movement pattern for each of the plurality of visitors to the plurality of exhibits during the second period, and the number of visitors to each of the exhibits as inputs.

[Supplementary Note 22]

The person flow prediction method according to Supplementary Note 21, further including
re-learning the prediction model based on the result of the prediction in the first period.

[Supplementary Note 23]

A program recording medium that records a person flow prediction program for predicting a person flow in an exhibition hall where a plurality of exhibition articles are exhibited, the person flow prediction program causing a computer to execute processing including:
acquiring attribute data about a plurality of exhibits and the number of visitors to each of the plurality of exhibits in a first period; and
predicting a future person flow of a visitor to the plurality of exhibits by inputting the attribute data and the number of visitors to each of the plurality of exhibits in the first period to a prediction model generated using attribute data for a second period that is a period previous to the first period, graph time-series data regarding a time-series change in movement pattern for each of a plurality of visitors to the plurality of exhibits during the second period, and the number of visitors to each of the plurality of exhibits.

The present invention has been described above using the above-described example embodiments as exemplary embodiments. However, the present invention is not limited to the above-described example embodiments. That is, various aspects of the present invention that can be understood by those skilled in the art may be applied within the scope of the present invention.

REFERENCE SIGNS LIST

10 Prediction model generation device
11 Acquisition unit
12 Storage unit
13 Graph generation unit
14 Prediction model generation unit
15 Prediction model storage unit
16 Prediction model output unit
20 Prediction device
21 Acquisition unit
22 Prediction model storage unit
23 Prediction unit
24 Graph generation unit
25 Prediction reason generation unit
26 Display control unit
30 Reading device
32 Image analysis unit
50 Camera
51 Image analysis unit
61 Acquisition unit
62 Prediction unit
70 Computer
71 CPU
72 Memory
73 Storage device
74 Input/output I/F
75 Communication I/F
100 Prediction system
300 Visitor management server
400 POS Server
500 In-store monitoring server

What is claimed is:

1. A person flow prediction system for predicting a person flow in an exhibition hall where a plurality of exhibition articles are exhibited, the person flow prediction system comprising:
at least one memory storing instructions; and
at least one processor configured to access the at least one memory and execute the instructions to:
acquire attribute data about a plurality of exhibits and the number of visitors to each of the plurality of exhibits in a first period; and
predict a future person flow of a visitor to the plurality of exhibits by inputting the attribute data and the number of visitors to each of the plurality of exhibits to a prediction model, wherein
the prediction model is generated based on attribute data for a second period that is a period previous to the first period, graph time-series data regarding a time-series change in movement pattern for each of a plurality of visitors to the plurality of exhibits during the second period, and the number of visitors to each of the plurality of exhibits.

2. The person flow prediction system according to claim 1, wherein
the at least one processor is further configured to execute the instructions to:
display a result of the prediction made and a reason for the prediction.

3. The person flow prediction system according to claim 2, wherein
the at least one processor is further configured to execute the instructions to:
superimpose the result of the prediction on a map of an area in which the plurality of exhibits are exhibited in the first period; and
display the superimposed map as the result of the prediction.

4. The person flow prediction system according to claim 2, wherein
the at least one processor is further configured to execute the instructions to:
generate graph time-series data indicating time-series changes in movement pattern of the plurality of visitors on a graph for the first period, based on the result of the prediction and graph data showing the graph including nodes indicating the plurality of exhibits, respectively, and edges each indicating that there is a visitor moving between the nodes in the first period; and
display the result of the prediction including the graph time-series data.

5. The person flow prediction system according to claim 4, wherein
the at least one processor is further configured to execute the instructions to:
extract an edge having a higher degree of contribution to the result of the prediction than other edges; and
generate the reason for the prediction based on information about the extracted edge.

6. The person flow prediction system according to claim 4, wherein
the at least one processor is further configured to execute the instructions to:
display data indicating the attribute data about the exhibits associated to the respective nodes in the graph data in accordance with the graph time-series data.

7. The person flow prediction system according to claim 1, wherein
the graph time-series data includes at least one of a time at which each of the plurality of visitors visits each of the plurality of exhibits, an order in which each of the plurality of visitors visits the plurality of exhibits, and a time during which each of the plurality of visitors stays in the visited exhibit, in a predetermined period.

8. The person flow prediction system according to claim 1, wherein
the attribute data includes at least one of an identifier of an exhibit, an exhibition position, an exhibition participation form, a field of an exhibition participation article, an exhibition participant, a business type that an exhibition participant is in, a business scale of an exhibition participant, the number of visitors that an exhibition participant attracted in the past, a sales record of a product associated with an exhibition participation article or an exhibition participation article, and a manufacturer of an exhibition participation article.

9. The person flow prediction system according to claim 1, wherein
the at least one processor is further configured to execute the instructions to:
generate data on a time-series movement pattern for each of the visitors used to generate the graph time-series data based on video data obtained by imaging the plurality of exhibits.

10. The person flow prediction system according to claim 1, wherein
the at least one processor is further configured to execute the instructions to:
generate the prediction model using machine learning, with the attribute data for the second period that is a period previous to the first period, the graph time-series data regarding a time-series change in movement pattern for each of the plurality of visitors to the plurality of exhibits during the second period, and the number of visitors to each of the exhibits as inputs.

11. The person flow prediction system according to claim 10, wherein
the at least one processor is further configured to execute the instructions to:
re-learn the prediction model based on the result of the prediction in the first period.

12. A person flow prediction method for predicting a person flow in an exhibition hall where a plurality of exhibition articles are exhibited, the person flow prediction method comprising:
acquiring attribute data about a plurality of exhibits and the number of visitors to each of the plurality of exhibits in a first period; and
predicting a future person flow of a visitor to the plurality of exhibits by inputting the attribute data and the number of visitors to each of the plurality of exhibits in the first period to a prediction model, wherein
the prediction mode is generated based on attribute data for a second period that is a period previous to the first period, graph time-series data regarding a time-series change in movement pattern for each of a plurality of visitors to the plurality of exhibits during the second period, and the number of visitors to each of the plurality of exhibits.

13. The person flow prediction method according to claim 12, further comprising
displaying a result of prediction of a person flow and a reason for the prediction.

14. The person flow prediction method according to claim 13, further comprising
superimposing the result of the prediction on a map of an area in which the plurality of exhibits are exhibited in the first period; and
displaying the superimposed map as the result of the prediction.

15. The person flow prediction method according to claim 13, further comprising:
generating graph time-series data indicating time-series changes in movement pattern of the plurality of visitors on a graph for the first period, based on the result of the prediction and graph data showing the graph including nodes indicating the plurality of exhibits, respectively, and edges each indicating that there is a visitor moving between the nodes in the first period; and
displaying the generated graph time-series data.

16. The person flow prediction method according to claim 15, further comprising
extracting an edge having a higher degree of contribution to the result of the prediction than other edges, and generating the reason for the prediction based on information about the extracted edge.

17. The person flow prediction method according to claim 15, further comprising
displaying the attribute data about the exhibits associated to the respective nodes in the graph data in accordance with the graph time-series data.

18. The person flow prediction method according to claim 12, wherein
the graph time-series data includes at least one of a time at which each of the plurality of visitors visits each of the plurality of exhibits, an order in which each of the plurality of visitors visits the plurality of exhibits, and a time during which each of the plurality of visitors stays in the visited exhibit, in a predetermined period.

19. The person flow prediction method according to claim 12, further comprising
generating the prediction model using machine learning, with the attribute data for the second period that is a period previous to the first period, regarding a time-series change in movement pattern for each of the plurality of visitors to the plurality of exhibits during the second period, and the number of visitors to each of the exhibits as inputs.

20. A non-transitory program recording medium that records a person flow prediction program for predicting a person flow in an exhibition hall where a plurality of exhibition articles are exhibited, the person flow prediction program causing a computer to execute processing comprising:
acquiring attribute data about a plurality of exhibits and the number of visitors to each of the plurality of exhibits in a first period; and
predicting a future person flow of a visitor to the plurality of exhibits by inputting the attribute data and the number of visitors to each of the plurality of exhibits in the first period to a prediction model, wherein
the prediction mode is generated based on attribute data for a second period that is a period previous to the first period, graph time-series data regarding a time-series change in movement pattern for each of a plurality of visitors to the plurality of exhibits during the second period, and the number of visitors to each of the plurality of exhibits.

\* \* \* \* \*